United States Patent
Gobbi

(10) Patent No.: US 12,512,903 B2
(45) Date of Patent: Dec. 30, 2025

(54) SYSTEMS AND METHODS FOR SERVICE RESTORATION FOR SATELLITE COMMUNICATIONS RESILIENCE

(71) Applicant: KBR Wyle Services, LLC, Houston, TX (US)

(72) Inventor: Richard L. Gobbi, Merry Hill, NC (US)

(73) Assignee: KBR Wyle Services, LLC, Houston, TX (US)

( * ) Notice: Subject to any disclaimer, the term of this patent is extended or adjusted under 35 U.S.C. 154(b) by 401 days.

(21) Appl. No.: 18/328,083

(22) Filed: Jun. 2, 2023

(65) Prior Publication Data
US 2023/0396326 A1 Dec. 7, 2023

Related U.S. Application Data

(60) Provisional application No. 63/348,813, filed on Jun. 3, 2022.

(51) Int. Cl.
*H04B 7/185* (2006.01)

(52) U.S. Cl.
CPC ..... *H04B 7/18513* (2013.01); *H04B 7/18534* (2013.01)

(58) Field of Classification Search
CPC .......... H04B 7/18513; H04B 7/18534
USPC ....................................... 455/427
See application file for complete search history.

(56) References Cited

U.S. PATENT DOCUMENTS

| 6,842,674 | B2 | 1/2005 | Solomon |
| 9,160,760 | B2 | 10/2015 | Vasseur et al. |
| 10,594,027 | B1 | 3/2020 | Arora et al. |
| 10,740,656 | B2 | 8/2020 | Arora et al. |
| 11,032,022 | B1 | 6/2021 | Sen et al. |
| 11,134,016 | B2 | 9/2021 | Arora et al. |

(Continued)

FOREIGN PATENT DOCUMENTS

| CN | 112115469 A | 12/2020 |
| CN | 112291800 A | 1/2021 |

(Continued)

OTHER PUBLICATIONS

Analysis of Antenna Point Loss In Satellite Communication Link (Oct. 2019) (Year: 2019).*

(Continued)

*Primary Examiner* — Rafael Pérez-Gutiérrez
*Assistant Examiner* — Aaron C. Deditch
(74) *Attorney, Agent, or Firm* — Gary M. Machetta

(57) ABSTRACT

A method for satellite communications network resiliency comprising, at a satellite service provider computing system: identifying a set of lost links between user terminals of a satellite communications network, wherein the lost links are due to a loss of at least one beam of the satellite communications network; determining a repointing of at least one user terminal to restore at least a portion of the lost links by using one or more optimization algorithms to determine a set of one or more user terminal repointings that maximize a reward based on the set of lost links and a network graph and a beam graph associated with the satellite communications network; and instructing repointing of the at least one user terminal.

17 Claims, 11 Drawing Sheets

(56) References Cited

U.S. PATENT DOCUMENTS

| | | | |
|---|---|---|---|
| 2009/0190491 A1* | 7/2009 | Miller | H04B 7/18513 370/252 |
| 2020/0143208 A1 | 5/2020 | Hernandez Leal et al. | |
| 2020/0257985 A1 | 8/2020 | West et al. | |
| 2021/0012239 A1 | 1/2021 | Arzani et al. | |
| 2021/0019194 A1 | 1/2021 | Bahl et al. | |
| 2021/0078735 A1 | 3/2021 | Kapp et al. | |
| 2021/0279632 A1 | 9/2021 | Di Pietro et al. | |
| 2021/0281493 A1 | 9/2021 | Miller et al. | |
| 2021/0326695 A1 | 10/2021 | Vitebsky et al. | |
| 2022/0012572 A1 | 1/2022 | Chen et al. | |
| 2024/0040461 A1* | 2/2024 | Da Silva | H04W 36/30 |

FOREIGN PATENT DOCUMENTS

| | | |
|---|---|---|
| CN | 2022/010409 A1 | 1/2022 |
| CN | 113973362 A | 1/2022 |
| CN | 2022/028926 A1 | 2/2022 |

OTHER PUBLICATIONS

Enhancing the Resilience of Low Earth Orbit Remote Sensing Satellite Networks (Jul. 2020) (Year: 2020).*

Resilient communication model for satellite networks using clustering technique (Nov. 2021) (Year: 2021).*

Communications Link—Chapter 14 (2021) (Year: 2021).*

Resiliency-based restoration optimization for dependent network systems (2021) (Year: 2021).*

Towards Resilient Access Equality for 6G (May 2022) (Year: 2022).*

Satellite Cyber Resilience Whitepaper (Apr. 2022) (Year: 2022).*

Uncertainty Theory-Based Resilience Analysis for LEO Satellite Communication Systems (Jul. 29, 2022) (Year: 2022).*

Fourati et al. (2021). "Artificial intelligence for Satellite Communication: A Review," Intelligent and Converged Networks 2(3):213-243.

Jagannath et al. (Sep. 2020). "Deep Learning and Reinforcement Learning for Autonomous Unmanned Aerial Systems: Roadmap for Theory to Deployment," Deep Learning for Unmanned Systems; 54 pages.

Luong et al. (Nov. 2019). "Applications of Deep Reinforcement Learning in Communications and Networking: A Survey," IEEE Communications Surveys & Tutorials 21(4):3133-3174.

Wu et al. "Beam Management for Cellular-Connected UAVs: A Fast Link Recovery Approach," 2020 IEEE/CIC International Conference on Communications in China (ICCC), Aug. 9-11, 2020, Chongqing, China; 758-763.

Zhang et al. (Aug. 2019). "Deep Learning in Mobile and Wireless Networking: A Survey," IEEE Communications Surveys & Tutorials 21(3):2224-2287.

* cited by examiner

SYSTEMS AND METHODS FOR SERVICE RESTORATION FOR SATELLITE COMMUNICATIONS RESILIENCE

CROSS-REFERENCE TO RELATED APPLICATIONS

This application claims the benefit of U.S. Provisional Application No. 63/348,813, filed Jun. 3, 2022, the entire contents of which is incorporated herein by reference.

FIELD

This disclosure is related generally to satellite communications, and more specifically, to resiliency of satellite communications.

BACKGROUND

Satellite communications (SATCOM) between user terminals (UTs) are supported through satellite systems in the geosynchronous (GEO), medium earth orbit (MEO) and low earth orbit (LEO) regimes. The management, control and business operations of such satellite systems depend on the combined efforts of SATCOM service providers, which can include government and/or commercial providers.

UTs transmit and receive modulated carrier signals via satellite beams. A beam can be defined by its frequency band, polarization, and orbital slot. Orbital slots (or simply slots) are satellite positions on the GEO belt. UT antenna discrimination allows satellites in distinct slots to service the same point on Earth if the slots are separated by some minimum angle (such as, for example, ~2 degrees for Ka-band). A UT can switch from one beam to another by changes in one or more of frequency, polarization, and slot. Beams may be lost due to outages or adversarial actions, such as radio frequency jamming. A UT communicating via a beam that experiences an outage may need to switch to another beam to continue communicating. A UT switching from one beam to another due to an outage may have ripple effects on the required pointing of UTs communicating with it, either directly or indirectly, utilizing the same or other beams of the same satellite.

SUMMARY

According to various aspects, systems and methods apply reward-based optimization to the problem of restoration and retainment of services to SATCOM network users in the event of outages or deliberate attacks (such as radio frequency jamming) on communications satellites. The systems and methods utilize the diversity of communications paths through the network and the level of control SATCOM network service providers have over utilization of the paths to determine connections between user terminals and satellites that restores and retains services provided by the SATCOM network. According to various embodiments, a method for satellite communications network resiliency includes, at a satellite service provider computing system, identifying a set of lost links between user terminals of a satellite communications network, wherein the lost links are due to a loss of at least one beam of the satellite communications network, determining a repointing of at least one user terminal to restore at least a portion of the lost links by using one or more optimization algorithms to determine a set of one or more user terminal repointings that maximize a reward based on the set of lost links and a network graph and a beam graph associated with the satellite communications network, and instructing repointing of the at least one user terminal.

According to an aspect, a method for satellite communications network resiliency includes, at a satellite service provider computing system, identifying a set of lost links between user terminals of a satellite communications network, wherein the lost links are due to a loss of at least one beam of the satellite communications network; determining a repointing of at least one user terminal to restore at least a portion of the lost links by using one or more optimization algorithms to determine a set of one or more user terminal repointings that maximize a reward based on the set of lost links and a network graph and a beam graph associated with the satellite communications network; and instructing repointing of the at least one user terminal.

Instructing repointing of the user terminal may include instructing the user terminal to change at least one of frequency, polarization, and orbital slot.

The loss of the at least one beam may be due to an adversarial attack.

The reward may be a revenue based on at least one revenue unit per unit data rate and at least one data rate of data traversing the network.

The method may include receiving data associated with a reward resulting from the repointing of the at least one user terminal and updating the one or more optimization algorithms based on the received data.

Identifying the set of lost links may include determining at least one user terminal associated with the at least one lost beam and determining which user terminals are communicating with the at least one user terminal associated with the at least one lost beam.

Repointing of the at least one user terminal may include repointing the at least one user terminal to a beam of a different satellite service provider and the reward is based on a cost to use the beam of the different satellite service provider.

The at least one lost beam may include a downlink beam or an uplink beam for the at least one user terminal.

According to an aspect, a system includes one or more processors, memory, and one or more programs stored in the memory for execution by the one or more processors for causing the system to perform any combination of the above methods.

According to an aspects, a non-transitory computer readable storage medium stores one or more programs for execution by one or more processors of a computing system for causing the system to perform any combination of the above methods.

BRIEF DESCRIPTION OF THE FIGURES

The invention will now be described, by way of example only, with reference to the accompanying drawings, in which.

DETAILED DESCRIPTION

Figure 1:
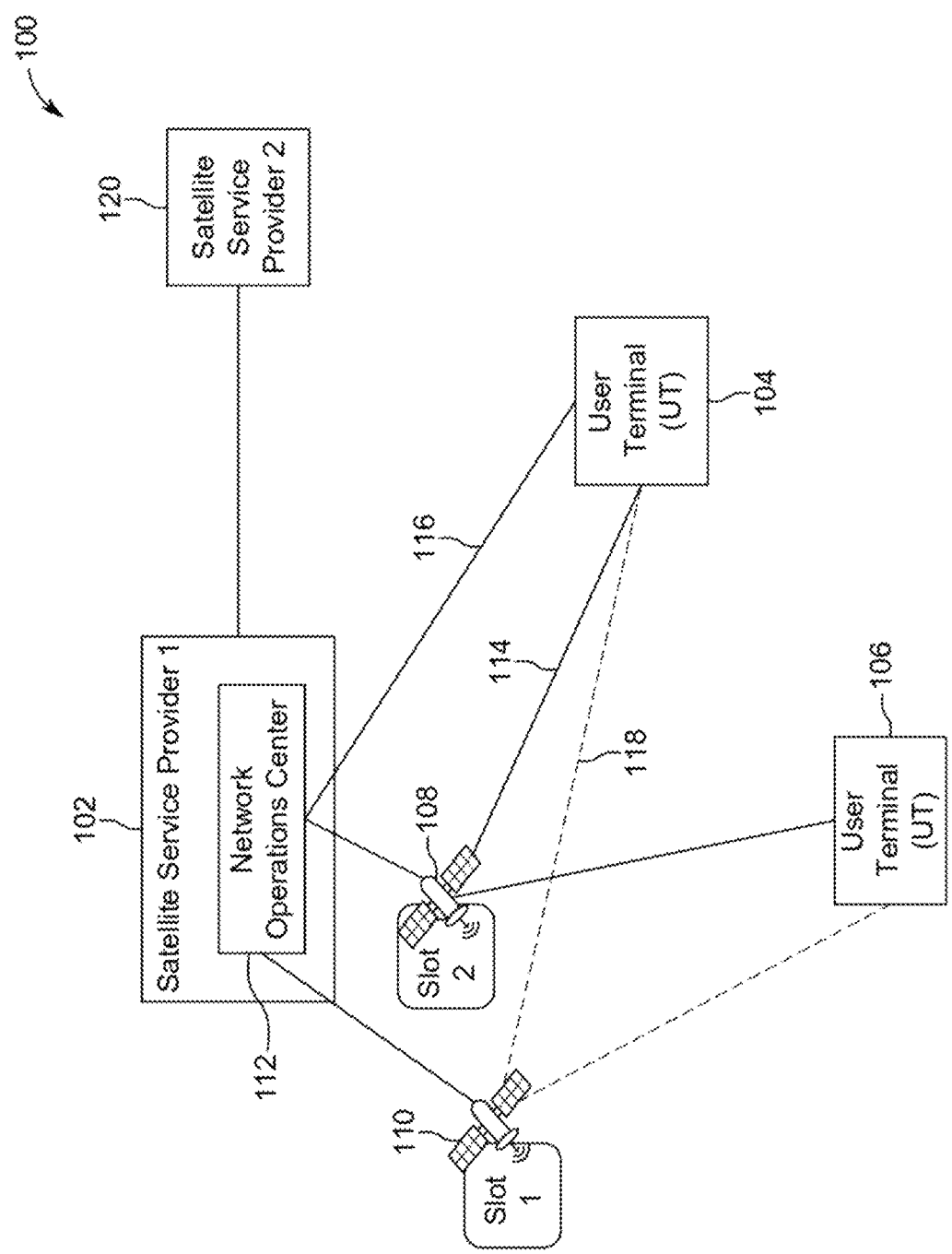
FIG. 1 is a block diagram of an exemplary satellite communications network.

Disclosed herein are examples of systems and methods for restoration of services to satellite communications (SATCOM) users in the event of outages or deliberate attacks (such as radio frequency jamming) on communications satellites. According to various embodiments, systems and methods determine repointing of UTs for restoration of lost services and retainment of existing services based on a representation of the SATCOM network that enables trades of throughput (including cost versus revenue and/or profit and priority-based throughput) performance versus the signal-path diversity required for resilience.

Although SATCOM systems are referred to below, the disclosure herein is not limited to satellite communications. Rather, the systems and methods described herein can be extended to cellular communications systems, with 5G base stations (i.e., gNBs) playing the role of satellites and smart phones and other user equipment (UE) playing the role of ground user terminals (UTs). All such advanced systems rely on maximizing frequency reuse by separating signals to multiple groups of user terminals (or 5G UEs) from multiple satellites (or 5G gNBs). Signal separation may be realized through diversity in frequency, spread spectrum codes (e.g., code-division multiple access, CDMA), signal and antenna electromagnetic polarization, and spatial separation coupled with user-terminal antenna discrimination.

According to various embodiments, systems and methods may be directed toward the features of geosynchronous Earth orbit (GEO) satellite systems operating in the millimeter wave (20-300 GHz) spectral region (which is most similar to the case of 5G cellular). However, this is not intended to be limiting, and the same principles can be extended to non-geosynchronous orbit (NGSO) SATCOM systems, including medium Earth orbit (MEO) and low Earth orbit (LEO) systems, all of which may be crucial in extending the reach of 5G services. Systems and methods may be extended to high Earth orbit (HEO) systems, with Molniya or Tundra orbits.

According to various embodiments, systems and methods can implement a model of a SATCOM system that is based on reasonable simplifying assumptions associated with characteristics of SATCOM systems. Following is a non-exhaustive description of assumptions that may be incorporated into a SATCOM system model to facilitate the application of algorithms. Each beam coverage area, or footprint, on Earth can be covered by multiple uplink (UL)/downlink (DL) beam pairs with separated UL/DL frequencies. Two beams covering the same footprint do not interfere with each other if and only if they differ in at least one of frequency, polarization or orbital slot. UT antenna discrimination allows satellites in distinct orbital slots to service the same point on Earth if the slots are separated by some minimum angle (e.g., approximately two degrees for Ka-band).

A widely applicable UT assumption (among others with added complexity) may be used in the model formulation wherein UT antennas are single-beam antennas which are covered by a single UL satellite beam and a single DL satellite beam that are both simultaneously pointed to cover the UT's footprint through which UTs transmit and receive modulated carrier signals. The UL and DL satellite beams referred to in this manner may be called a beam pair. This assumption exposes that networked UT frequency/polarization/orbital slot "pointing," fundamental to service restoration, may be affected, even if a UT is not jammed, by adversary jamming attacks in satellite networks, wherein connected UTs removed by one or more satellite hops from directly affected UTs must also repoint to retain service. This cascade of pointing change requirements to maintain communication services affected due to a jammed UL beam, for example, is approachable within this framework.

According to various embodiments, a network graph (NG) may be formulated that is a directed connection graph between UTs (serving as the nodes of the graph) with one-way communication links at fixed data rates and priorities forming the arcs (a.k.a. directed edges) of the directed graph. There can be multiple arcs between UTs of different data rates and priorities with no self-directed arcs; such a graphical structure may be called a weighted directed multigraph (multidigraph) without self-loops, where the weight are the data rates.

A beam path (BP), consisting of a UL beam to a satellite and a DL beam from the satellite, identifies a physical path between footprints through satellites. Satellites may be considered as transparent, meaning that the satellite payload is effectively modeled in various embodiments as a non-blocking switch of modulated carrier signals between UL beams and DL beams.

Figure 5:
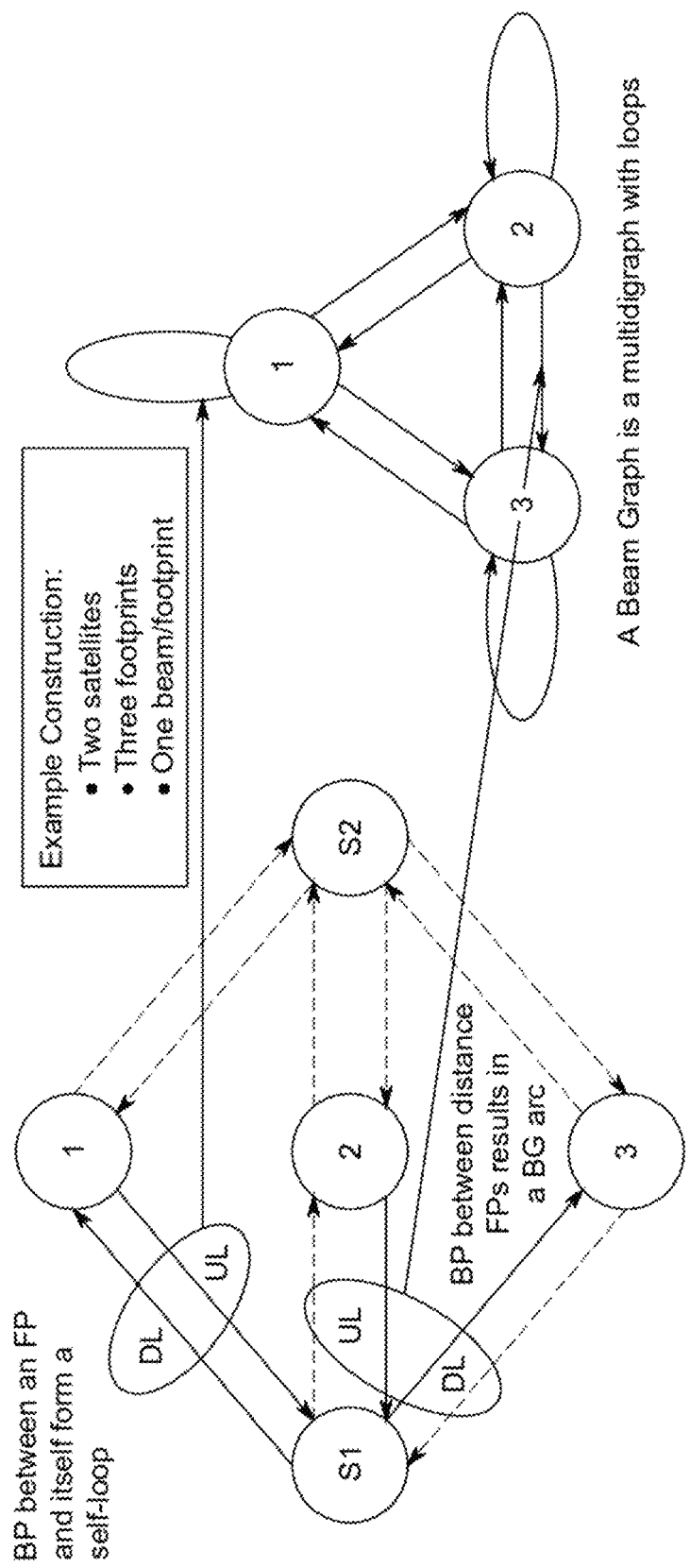
FIG. 5 illustrates the construction of an exemplary beam graph.

A directed graph closely related to the NG is the beam graph (an example is shown in FIG. 5) of a satellite, with footprints serving as nodes and BPs serving as arcs.

One-way communications links (simply called links) between two UTs, which are the arcs of an NG, are contained in the BPs of the corresponding beam graph. A fundamental relationship (before an outage or jamming attack) between the NG and the beam graph is that the set of all links in an NG is partitioned (in the set theoretical sense) by BPs of the beam graph; that is, each link is in a single BP and the union of the BPs, considered as sets of links, is the set of all links. This structure may enable application of one or more optimization algorithms to the problem of link restoration after attack on UL or DL beams or on satellites. The partitioning of links may enable application of one or more optimization algorithms such as mathematical programming (e.g., linear programming) or heuristic optimization techniques to the bin (e.g., BP) packing problem based on the difference between the defined capacity of a BP and its throughput, which is the sum of the carried, or to-be carried, data rates. Likewise, other optimization algorithms such as iterative machine learning (e.g., reinforcement learning) may be applied to learn policies for link restoration action choice (which affected links to assign to which BPs) in the face of jamming attacks extended over time, where accumulated revenue based on data rate throughput may be a satellite service provider's reward for good performance.

A beam graph network structure can form the basis for one or more algorithms to deal with attacks on satellite networks. Also, the two different BP (arc) adjacency relationships in a beam graph may be important to decisions between BP choices for placement of jammed links and indirectly affected links, driven by the revenue increase versus cost of moving links between BPs. The two different adjacency relationships are: (1) two BPs, one an in-arc to a common node (footprint), the second, an out-arc, are adjacent in the beam graph if the DL beam of the in-arc and UL beam of the out-arc are not a beam pair, and vice versa (adjacency is irrespective of direction); and (2) two BPs which share a common beam, which is a beam pair covering the footprint, are adjacent in the beam graph. In the latter case (2), an attack on (or outage of) either the UL beam or DL beam of the respective BPs may have a cascading effect on required UT pointing to maintain or restore links (called the cascading repointing problem). In the former case (1), restoration of links through UT repointing to alternative beams in lieu of the jammed beam (UL or DL) has no effect on the required pointing of UTs covered by the other (UL or DL) beam.

The choice to point UTs toward alternative satellites in order to restore jammed links based on cost versus revenue criteria can be constrained by the cascading repointing problem. Algorithms, such as breadth-first search (BFS), may be used in the subgraph of the beam graph defined by common-beam adjacency in order to determine the magnitude of the system throughput impacted due to the cascading repointing problem.

In various embodiments, a link has an UL part and a DL part. The UL part is carried by an UL beam and the DL part is carried by a DL beam. The corresponding (UL beam, DL beam) pair is the BP which carries the link. The UL beam of the pair is said to carry the UL part of the link. The DL beam of the pair is said to carry the DL part of the link. An in-link to a UT is the DL part of a link which terminates at the UT. An out-link of a UT is an UL part of a link that emanates from the UT.

According to various embodiments, a link can be represented in a separate directed graph representation as a sequence of four directed edges, the first from the UT to the UL beam, the second from the UL beam to the satellite (or slot), the third from the satellite to the DL beam, and the fourth from the DL beam to the second UT. In this alternative graphical representation, the UTs, satellite UL beams, satellites DL beams and satellites are the nodes of the directed graph. Such graphs are useful in computer representations of satellite networks and enable tracking of the identity of links.

According to various embodiments, a gateway in a satellite network is a ground station that communicates with a satellite using frequencies not accessible by UTs. In some satellite networks, gateways can communicate with more than one satellite. Gateways can operate on beams, usually called feeder links, at frequencies different and separated from UT frequencies. Thus, gateways can occupy the same footprints as UTs with negligible interference.

According to various embodiments, in some networks, a gateway can be a source and/or sink of data communications with UTs. In such networks, the UL beam and DL beam between the gateway and the satellite, i.e., the feeder links, operate as a beam pair as defined herein. The resulting network type is a hub-spoke network.

According to various embodiments, a gateway can act as a relay between separate coverage areas, in which case the UL part of a link carried by a satellite UL beam is connected, through an intermediate DL and UL feeder-link pair, with the DL part of the link carried by a different satellite DL beam. Such a link (viewed as an ordered pair of UTs) is called an inter-satellite link (ISL).

According to various embodiments, a crosslink is a two-way communications medium between two satellites which connects the UL parts and DL parts of links between UTs. A link between two separate coverage areas through a crosslink is an ISL, as in the case of a gateway connection between separate coverage areas.

According to various embodiments, crosslink and gateway connections are modeled as having minimal data rate limitations in comparison to UT communications, and as being less susceptible to jamming attacks.

Systems and methods, according to various embodiments, may be implemented by one or more service provider (SP) SATCOM systems. Satellites and user terminals may be owned by SPs with access to bandwidth governed by the rules of frequency reuse and ownership. Specifically, UTs and the links connecting them may be owned by an SP. SPs may receive revenue for links supported by an SP SATCOM System. Cost to a link-owner SP may be incurred when its links are carried by BPs owned by a competing SP. Control of the restoration of links after beams are attacked may depend on rules established based on ownership of beams or satellites.

Systems and methods may implement a flexible revenue and cost model that enables analysis of the game theoretical paradigms of SP competition and cooperation in face of attacks and outages. The game may proceed under rules governed by frequency reuse and ownership with revenue impacted by access cost. Within this framework, rigorous or heuristic mathematical programming techniques may be applied to determine near-optimal game moves. Likewise, reinforcement learning may be applied in the case of jamming attacks extended probabilistically over time to determine policies, which may be considered equivalent to game moves made by a controller of link restoration, where the controller role may be passed among the SPs within the network over time.

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

In the following description, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining,"

"displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some embodiments also relates to a device for performing the operations herein. This device may be specially constructed for the required purposes, or it may comprise a general-purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability. Suitable processors include central processing units (CPUs), graphical processing units (GPUs), field programmable gate arrays (FPGAs), and ASICs.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein.

FIG. 1 is a simplified block diagram of an exemplary satellite communications network 100 configured for restoration of services to users in the event of outages or deliberate attacks (such as radio frequency jamming) on communications satellites. SATCOM network 100 includes at least one satellite service provider 102 that provides satellite communications service to one or more user terminals (UT), such as UT 104 and UT 106. UT 106 transmits and receives modulated carrier signals via satellite beams to and from one satellite at a time of the satellites 108 and 110, which are each positioned in an orbital slot (e.g., slot 1 and slot 2). The UTs include a satellite communications antenna which, in various embodiments, forms a single beam, and associated hardware and software for processing satellite communications signals that are received from one satellite and generating satellite communication signals for transmitting to the same satellite. The at least one satellite service provider 102 is configured to determine repointing of UTs 104 and 106 for restoration of lost services and retainment of existing services in the event of outages or deliberate attacks. For example, in the event that satellite 108 is jammed via an adversarial attack, satellite service provider 102 may determine repointing of UT 104 and UT 106 from satellite 108 to satellite 110.

Satellite service provider 102 may include a network operations center 112 that controls the satellite communications network of the service provider 102. The network operations center 112 may receive status information regarding the satellites in its network, such as from satellites 108 and 110, and may transmit control signals to the one or more satellites. The network operations center 112 may communicate with UTs that are within its network, such as UT 104 and UT 106. The network operations center 112 may transmit control commands to the UTs within its network, such as to command a UT to repoint to a different beam. The network operations center 112 may communicate with UTs via satellite communication beams 114 and/or may communicate using any other out-of-user/customer-frequency band communications connection 116 (e.g., via any combination of ground-based wired and/or wireless communications network). The network operations center 112 may be physically located at a single location or may be a plurality of sub-centers distributed among multiple physical locations, which may be communicatively connected to each other in any suitable way, such as via a backhaul network. The network operations center 112 may be communicatively connected to one or more other satellite service providers 120, which may be useful for enabling one or more UTs under control of satellite service provider 120 to use the satellite services of satellite service provider 102 (e.g., user of the residual capacity under a revenue sharing agreement with the service provider), and/or for enabling one or more UTs under control of satellite service 102 to use the satellite services of satellite service provider 120.

Network operations center 112 may maintain information about the satellites and/or UTs within its network. Information about a satellite maintained by network operations center 112 can include information about the location of the satellite and the footprints, frequencies, and/or polarizations of the beams provided by the satellite. Information about a UT maintained by network operations center 112 can include links to the UT (e.g., all in-links and out-links for the UT). The network operations center 112 can also maintain a lost link list, which can include a list of links that cannot be restored or which are lost as a result of the restoration process and are added to the lost links list (LLL). A lost links list can be determined and maintained based on a comparison of the beam path of each link, knowledge of lost beams (resulting from an attack or other cause) and whether or not systems and methods were able to restore/retain links by moving links to operative beam paths. Network operations center 112 may model at least a portion of the network 100 as a network graph (UTs in footprints with links between them defined) and a beam graph (each link assigned to a beam graph arc). Network operations center 112 may use one or more optimization algorithms to determine a set of one or more user terminal repointings based on the network graph, the beam graph, and a set of lost links, as described further below.

Figure 2:
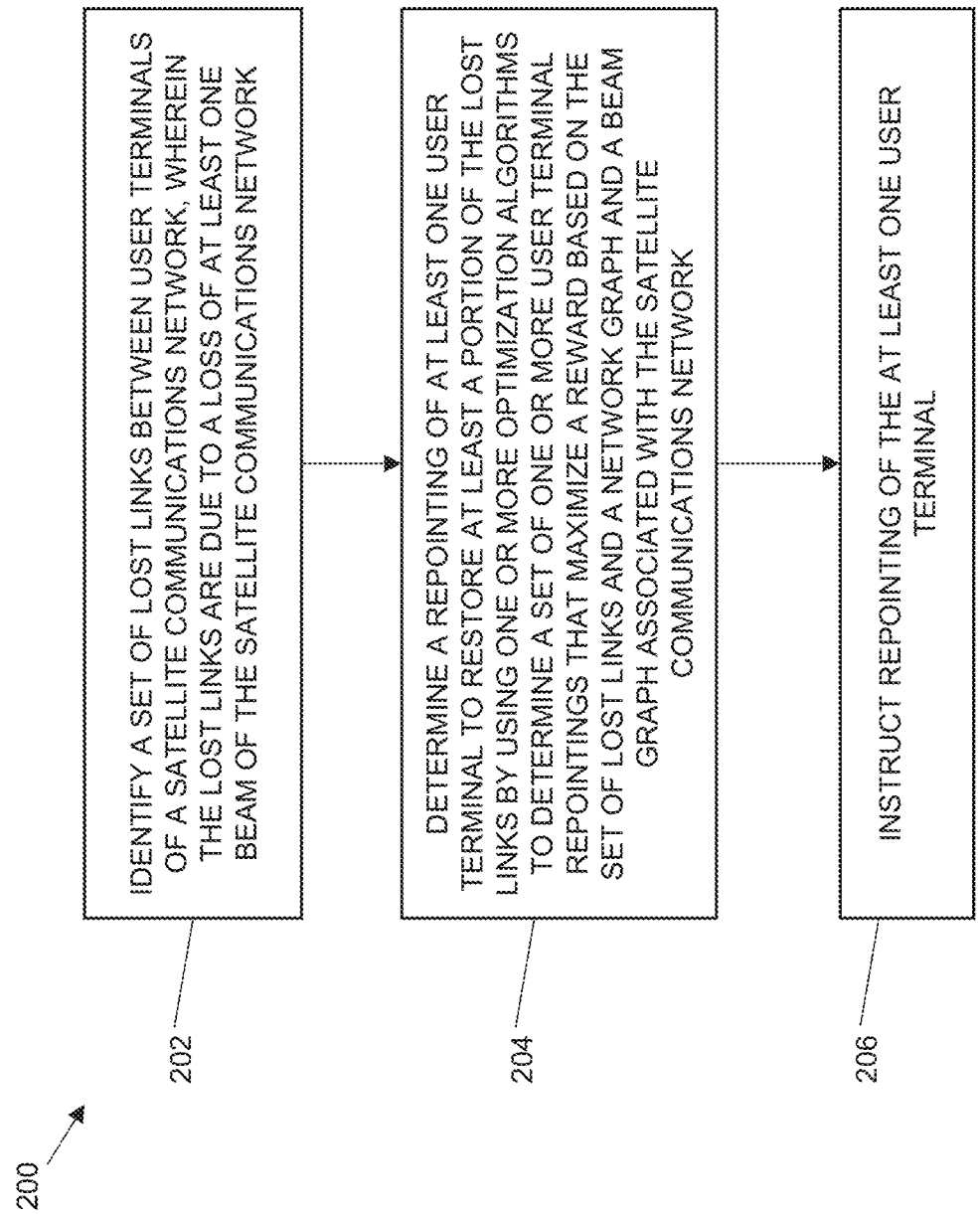
FIG. 2 is a flow diagram of an exemplary method for satellite communications network resiliency.

FIG. 2 is a flow diagram of an exemplary method 200 for satellite communications network resiliency. Method 200 may be performed by a satellite service provider computing system, such as network operations center 112. Method 200 may be performed by multiple satellite service providers, and the actions of each satellite service provider may impact one or more other satellite service providers. For example, residual capacity sharing agreements between satellite service providers may enable service providers to utilize resources of another satellite service provider and actions taken by one satellite service provider performing one or more steps of method 200 may affect another satellite service provider (such as one satellite service provider repointing one of its UTs to a beam of the other satellite service provider).

At step 202, a set of lost links between UTs of a satellite communications network is identified. The lost links may be due to a loss of at least one beam of the satellite communications network, which may include one or more downlink beams and/or one or more uplink beams. The lost beam may result from, for example, one or more adversarial attacks (e.g., jamming). The set of lost links can be identified, at least in part, by determining at least one user terminal associated with the at least one lost beam and determining which user terminals are communicating with the at least one user terminal associated with the at least one lost beam. For example, with reference to FIG. 1, the network operations center 112 may determine that a beam 114 has been lost and may determine that UT 104 was using beam 114 to communicate with UT 106.

At step 204, a repointing of at least one user terminal is determined to restore at least a portion of the lost links. The repointing of the at least one user terminal may be determined using one or more optimization algorithms that determine a set of one or more user terminal repointings that maximize a reward based on the set of lost links and a network graph and a beam graph associated with the satellite communications network. The reward can include a revenue that is based on at least one revenue unit per unit data rate and at least one data rate unit of data traversing the network.

At step 206, a repointing of the at least one user terminal is instructed. For example, with respect to network 100 of FIG. 1, the network operations center 112 may command user UT 104 to repoint to a different beam of satellite 108 or to a different satellite, such as satellite 110, in the event that a beam of satellite 108 is lost due to a jamming attack. A repointing command can include instructing the user terminal to change at least one of frequency, polarization, and orbital slot.

Optionally, repointing of the at least one user terminal can include repointing the at least one user terminal to a beam of a different satellite service provider. For example, with reference to FIG. 1, network operations center 112 may determine that optimization for restoring lost links should include redirecting UT 104 to a beam of a satellite of satellite service provider 120. The optimization algorithm used by network operations center 112 in step 204 may include a reward that is based on a lesser cost to use the beam of satellite service provider 120. For example, in a case of insufficient path diversity or residual capacity, a revenue maintained using the beam of satellite service provider 120 may be more than the cost of using that beam.

Exemplary Model Formulation

The following describes an exemplary formulation of a SATCOM network model that can be used for optimizing restoration of services. The SATCOM network model may be implemented by, for example, network operations center 112 to model network 100 and may be used in step 204 of method 200. A beam relative to a satellite is either a receive (Rx) or transmit (Tx) antenna beam. A Tx beam is referred to herein as a downlink (DL) beam and a Rx beam is referred to herein as an uplink (UL) beam. A beam has a band of frequencies and a polarization, where two oppositely polarized beams do not interfere. According to various embodiments, the SATCOM models herein assume that UL beams and DL beams are paired, meaning that the ULB and DLB are congruent and that UTs transmit and receive signals via the UL beam/DL beam pair, and this pairing defines satellite a beam. Implemented, for example, by a diplexer which allows signals of the UL and DL frequencies to share the same satellite antenna beam. The frequency bands for UL and DL are separated to avoid interference as is the case, for example, in the Ka-band.

Figure 3A:
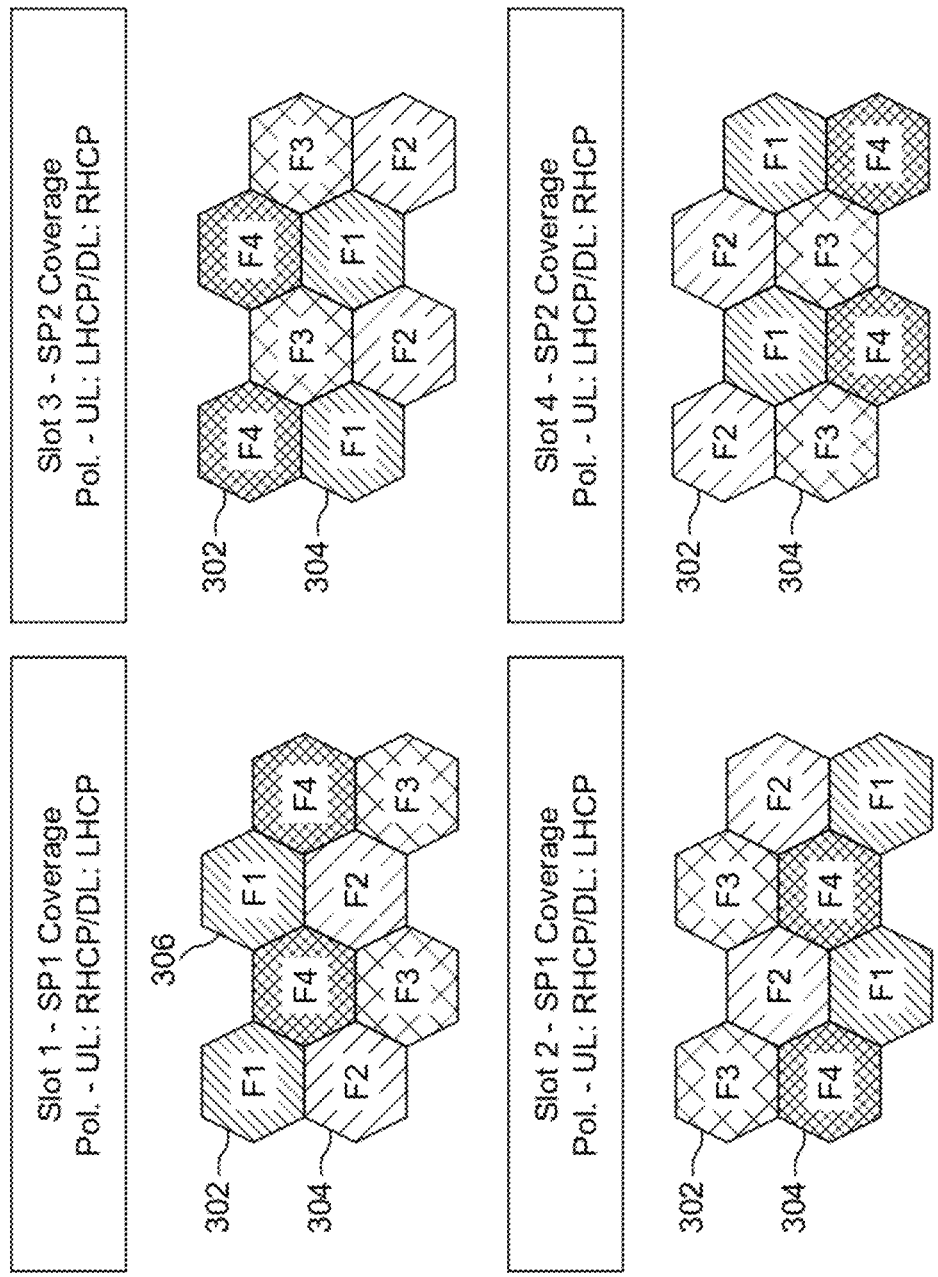
FIG. 3A shows an example of frequency reuse.
Figure 3B:
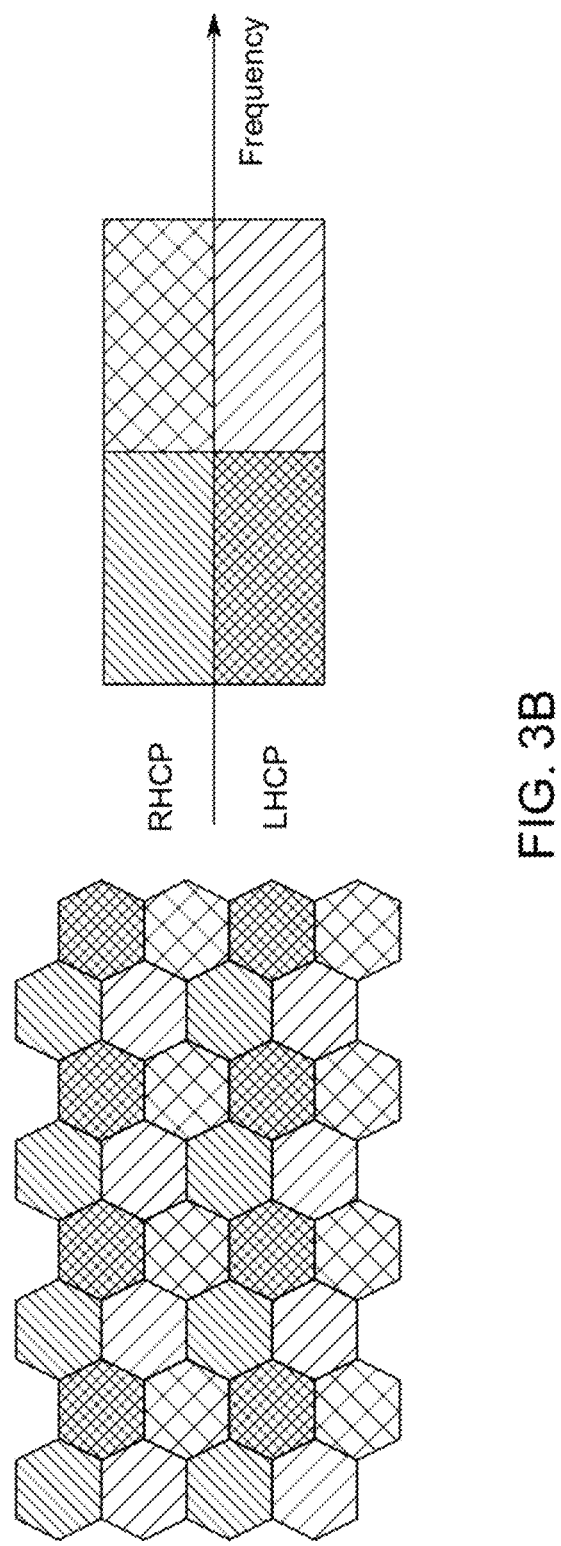
FIG. 3B illustrates an example of a lower-interference frequency reuse scheme.

According to various embodiments, the SATCOM model can assume fixed beam coverage areas, referred to as footprints (FPs), and fixed beams covering them. Each beam coverage area, or footprint, on Earth can be covered by multiple uplink (UL)/downlink (DL) beam pairs with separated UL/DL frequencies as illustrated in exemplary embodiments of frequency reuse in FIG. 3A and FIG. 3B. FIG. 3A and FIG. 3B illustrate how different beams can cover the same eight FPs (e.g., FP 302, FP 304, etc.). In FIG. 3A, each of the four sections shows how the corresponding satellite (each of which may belong to a different satellite service provider) may cover the eight FPs. Each of the four satellites (Slot 1 through Slot 4) cover each footprint with a different frequency (F1-F4). For example, the Slot 1 satellite covers FP 302 with frequency F1 and the Slot 2 satellite covers FP 302 with frequency F3. UL beams and DL beams for each footprint are provided by different polarizations for the given frequency. A given satellite reuses a given frequency for footprints that are separated by at least one other footprint. For example, the Slot 1 satellite uses frequency F1 for FP 302 and FP 306.

As noted above, reasonable simplifying assumptions allow automated algorithms to distinguish two beams covering the same footprint by assuming they do not interfere with each other if and only if they differ in at least one of frequency, polarization or orbital slot. UT antenna discrimination allows satellites in distinct orbital slots to service the same point on Earth if the slots are separated by some minimum angle (e.g., approximately two degrees for Ka-band). It is well known that satellites occupying the same orbital slot must have synchronized timing if they cover the same FPs. Therefore, modulated carriers transmitted to and received from such satellites appear to be transmitted to or received from a single satellite in the orbital slot. Thus, the terms 'satellite' and 'slot,' or 'orbital slot,' are used interchangeably. The frequency reuse scheme pictured in FIG. 3B, commonly used in high throughput satellite (HTS) systems, represents a compromise between throughput and interference mitigation, where, for each footprint, four adjacent beams have different polarization, in contrast to FIG. 3A where all adjacent beams have the same polarization. FIG. 3A represents a more aggressive scheme allowing more throughput at the expense of higher real-world interference.

As used herein, a "link" is a directed communications connection between two UTs. An example of links for a UT is illustrated in FIG. 4A. The UT 400 receives communications from one or more transmitting UTs 402 via a downlink beam 404 and transmits communication to one or more receiving UTs 406 via an uplink beam 408. A UT is modeled (e.g., by network operations center 112 of FIG. 1) as transmitting and receiving on two spatially congruent satellite beams whose signals are, in various embodiments, separated in a diplexer onboard the satellite, and, as illustrated in FIG. 4A, there can be several links within the beam. In absence of a jamming attack, a link traverses the following path: UL beam, satellite payload, DL beam, where the latter is any DL beam supported by the satellite. The UL part of the link is the connection between a first UT and the satellite payload. The DL part is the connection between the satellite payload and a second UT.

Figure 4B:
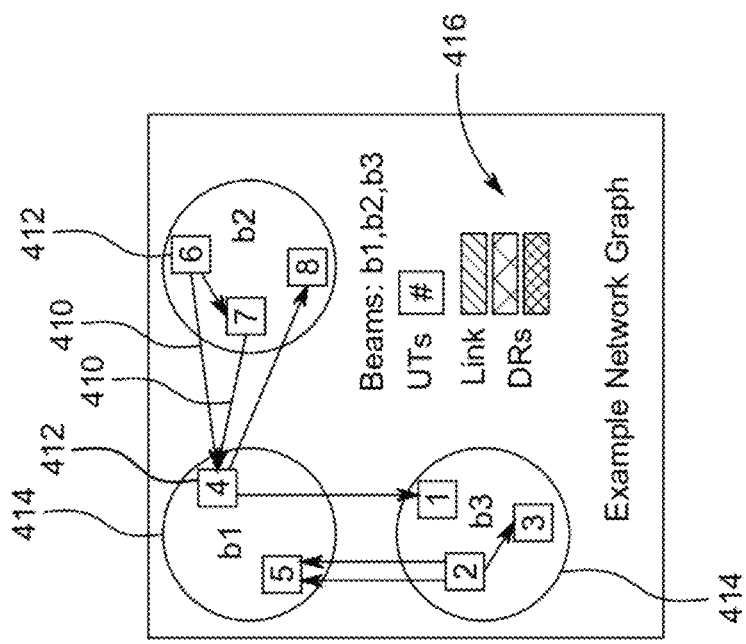
FIG. 4B illustrates an example network graph.
Figure 4A:
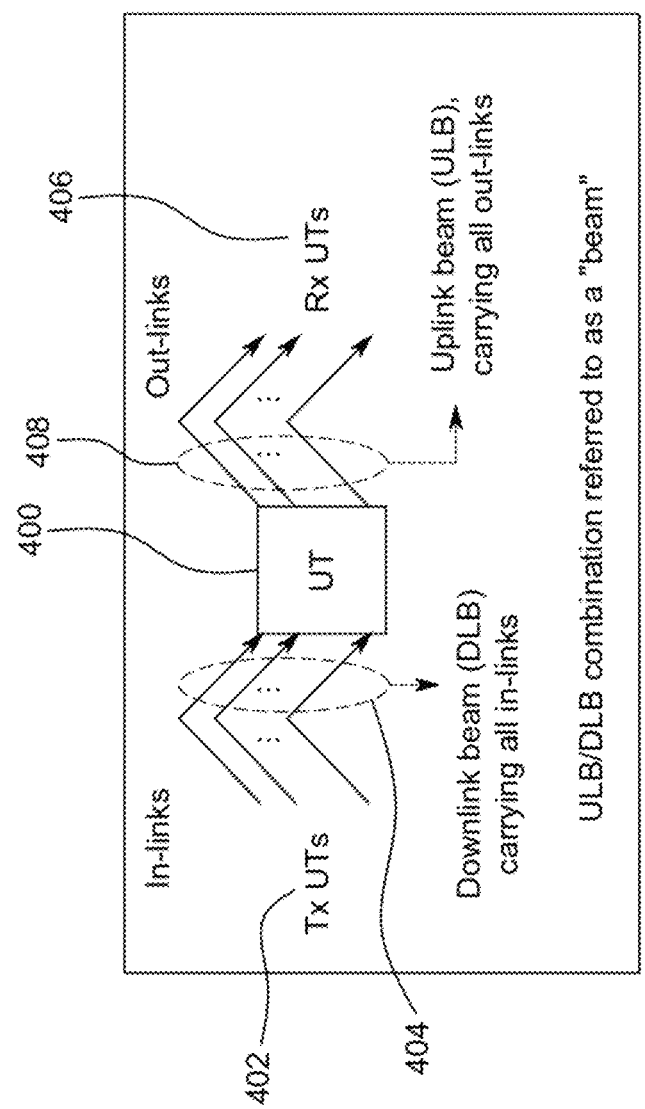
FIG. 4A illustrates a user terminal view of in-links and out-links for the user terminal.

An example network graph (NG) is illustrated in FIG. 4B, which illustrates a plurality of links 410 between different UTs 412 (numbered 1-8) in three different beams 414. The links can have different data rates (DR) 416. The network graph does not allow self-loops, since no communications link can exist from a UT to itself.

According to various embodiments, UTs are modeled as having fixed geographic locations. The terms "link" and "arc" are used interchangeably herein. A link is defined as an ordered pair of UTs together with a data rate and, optionally, a priority, with the order of the UTs defining the "direction" in the associated graph. Links exist independent of any physical path that may carry them.

Figure 8:
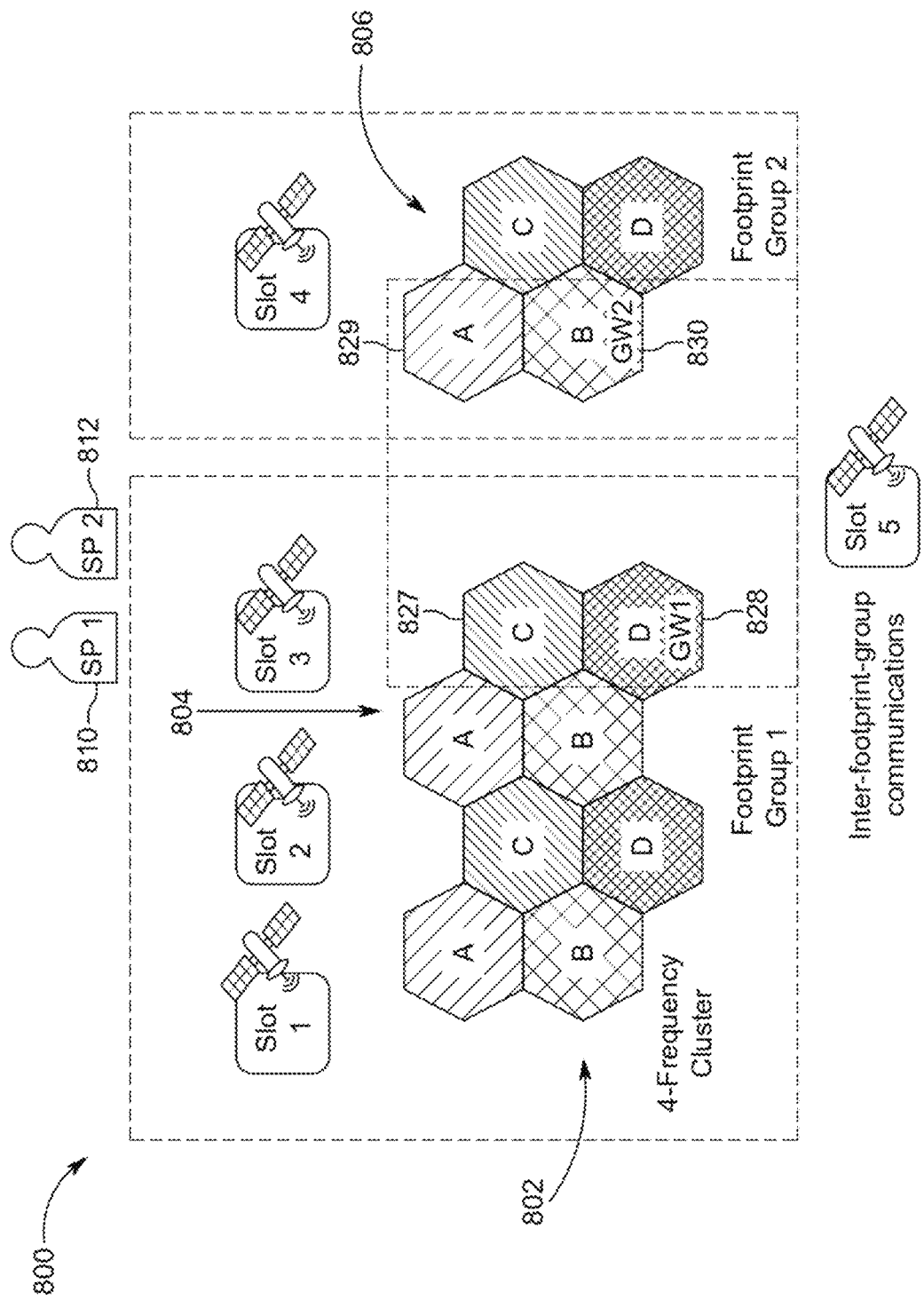
FIG. 8 illustrates an example of a multi-service provider SATCOM system.

In various embodiments, synthetic SP SATCOM networks can be generated using the principles of random network generation and well-known models of network formation such as preferential attachment. Such models produce scale-free and other types of nodal degree distributions that have been determined to exist in real networks via measurement of network traffic in various commercial and military networks. To apply these principles to SP SATCOM systems, structural models are required because these networks have unique features, e.g., the beam graph structure and frequency reuse rules, that distinguish them from other networks. In various embodiments, the resulting synthetic network models can be used to develop and test machine learning and optimization algorithms for SATCOM network resilience. An example SP SATCOM system 800, for this purpose, with two service providers (service provider 810 and service provider 812), is pictured in FIG. 8. Service providers 810 and 812 own satellites in Slots 1-5. Service provider 810 owns Slot 1 and Slot 4 satellites and service provider 812 owns Slot 2, Slot 3, and Slot 5 satellites. An underlying 4-frequency cluster is shown wherein each footprint in the A-B-C-D pattern employs one of four frequencies with one or two polarizations, as in the example of FIG. 3A, with a simplifying assumption of negligible communications interference. In the systems and methods described herein, cluster-size can be specified. In the example illustrated in FIG. 8, Footprint Group 1 consists of two 4-frequency clusters 802 and 804 and Footprint Group 2 consists of one 4-frequency cluster 806. Slots 1, 2, and 3 cover Footprint Group 1 and Slot 4 covers Footprint Group 2. Slot 5 covers footprints 827, 828, 829, and 830. Slot 5 enables communication between the footprint groups via the gateways, GW1 and GW2. GW1 communicates with Slots 1, 2, 3 and 5. GW2 communicates with Slots 4 and 5. Systems and methods described herein can support network generation using more interference-resistant frequency reuse schemes, such as that in FIG. 3B.

According to various embodiments, the following simplifying assumptions are referred to as capable UT and satellite assumptions: all UL beams and DL beams are identical, except for frequency band and polarization; all UTs are identical and can transmit all defined data rates; and each beam can support any of the UTs at any of the assumed data rates. These assumptions can be relaxed with added complexity in applications. These assumptions are reasonable for systems with advanced waveforms and error correction coding, with UTs employing power control and bandwidth efficient waveforms. The model applies to full on-board processing satellites or to transponders. In the latter case, power control with a favorable input backoff versus output backoff configuration in the nonlinear case is assumed. These assumptions allow data rate (DR) throughput relative to a maximum DR throughput, referred to as capacity, to be analyzed by assuming an average spectral efficiency (bps/Hz). Such assumptions are often made in comparisons of SATCOM systems. Additionally, various embodiments include the fluid data rate assumption, meaning a link can be loaded onto a beam if and only if sufficient capacity exists; thus, channelization details are ignored.

According to various embodiments, jamming attacks are assumed to be launched independently against UL beams. When an UL beam is attacked, all UT transmissions through the beam are lost. These assumptions may be modified to cover natural events such as heavy rain, which can simultaneously affect co-coverage satellite beams or oppositely polarized beams. Continuing with this point, according to the frequency reuse and beam separation rules used herein, an alternative beam in a jamming scenario can be an overlaid beam of opposite polarization or orthogonal frequency; an idealization in which each of these beams can be independently attacked may be assumed. This results in a complete idealization which can be modified as needed for applications.

According to various embodiments, power and bandwidth loading levels of DL beams can be included in the SATCOM modeling. The power and bandwidth model assumed is for satellite transponders. The following assumptions may be made. First, for each DR, there is a received carrier power, $C_{UL}$, that is required for link closure, at the output of each UL beam, which is the same for all beams and all SP System satellites. Second, there is a modulation and coding spectral efficiency (se) for each DR that increases with increasing DR. Third, each path from UT to satellite receive front-end, and on to input to the DL antenna, has a system noise temperature, $T_S$, that is the same for all beams on all SP System satellites. Fourth, the electronic gain, $g_E$, for the paths from output of each UL beam to input to each DL beam is the same for all beams on all SP System satellites. Under these assumptions, a model of power and bandwidth usage can be developed as follows. Let k be Boltzmann's constant. The noise spectral density, with units W/Hz, $N_0$, is $N_0 = kT_S$. For an SP System, it is reasonable to assume ideal packing of signals, i.e., with normalized bandwidth carrier spacing equal to one. This results in a value for the used bandwidth ($b_u$) for each link's signal that is equal to the data rate divided by coding spectral efficiency (se). Then, the power used ($p_u$) by a link's signal and in-band noise is:

$$p_u = C_{UL} * g_E + N_0 * b_u$$

The throughput (TP) of a UL or DL beam is the sum of the data rates of its supported links. The capacity of a UL or DL beam is the maximum this sum is allowed to be. Access to a UL or DL beam is controlled by an SP based on UL or DL beam TP and capacity. The residual capacity is the difference between capacity and TP.

According to various embodiments, an attack is modeled as an attack on a UL beam that results in the loss of all out-links carried by the UL beam. Modes of attack can include an attack on a single beam only or attacks on multiple beams. One or more beams may be attacked at random, according to a probability distribution.

The "pointing" of a UT refers to the UT antenna's frequency, polarization and physical pointing toward a GEO slot (that is, to a satellite in the slot). A UT repoints to a beam if it changes any of GEO slot, frequency or polarization. To restore lost links, UTs will repoint, possibly under direction from an SP management layer, to a different beam on the same satellite, to a different same-slot co-coverage satellite, or toward a different-slot co-coverage satellite whose beam covers the UT's footprint.

Figure 6:
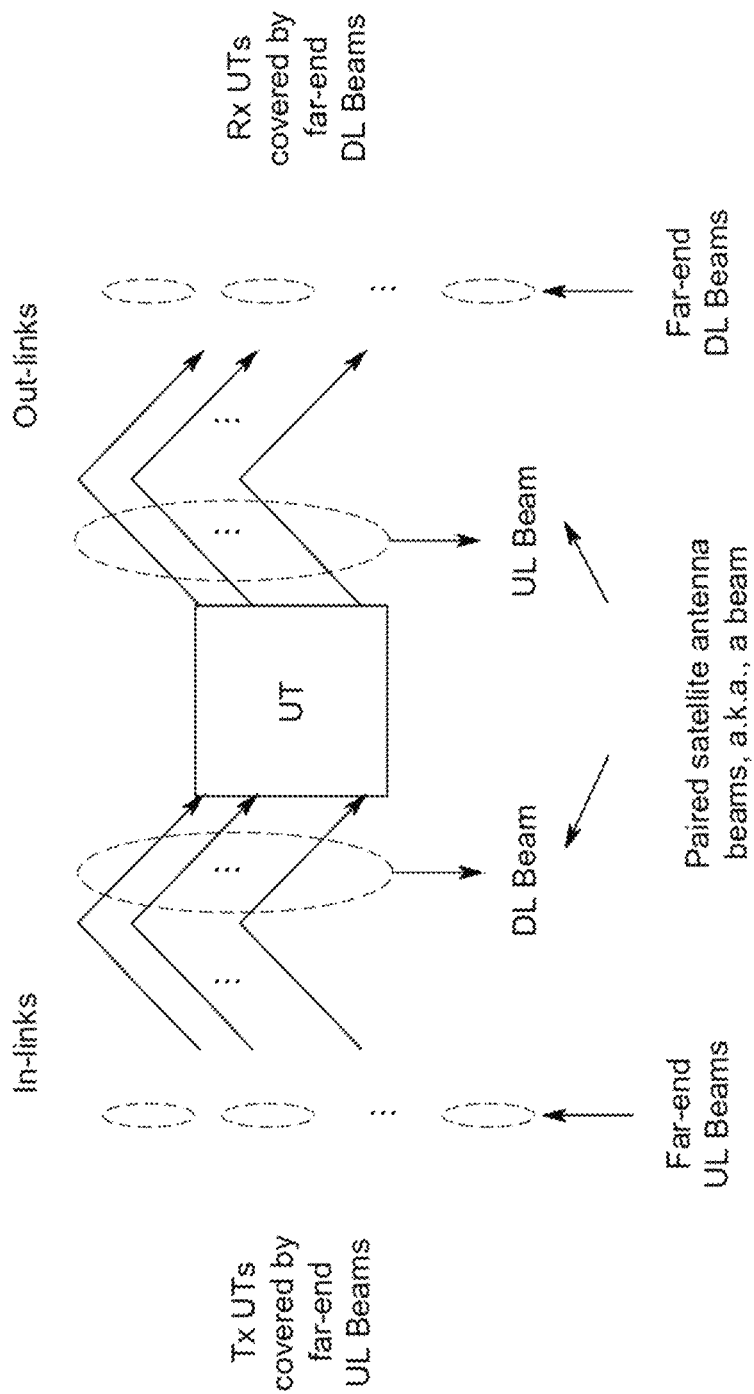
FIG. 6 illustrates an exemplary user terminal view in link restoration.

With reference to the exemplary UT perspective illustrated in FIG. 6, restoration of links lost due to an attack on an UL beam involves repointing of directly affected and collaterally affected UTs toward alternative beams. In the example of FIG. 6, all in-links and out-links are owned by the same SP, the link-owner SP, who owns the UT of interest in FIG. 6 and the far-end Rx-UTs and Tx-UTs. This is so because links are only defined between UTs that belong to the same SP. SPs own satellites and, effectively, the orbital slots occupied by satellites. The beams of the satellites are therefore owned by SPs.

Determining Link Restoration Via Reinforcement Learning

According to various embodiments, reinforcement learning is used to determine one or more moves for link restoration. In some embodiments, Monte Carlo simulation techniques are used. The behavior of a SP System in face of attacks is broken into episodes, also referred to as rounds. In reinforcement learning using the policy gradient method, the policy updates take place at the end of episodes.

Based on a reward signal, attack state of the system, and a lost links list (LLL), SPs define link restoration actions for UTs and spare capacity usage criteria for each of its DL beams. The operation of the SP System simulation is as follows, starting with time round 0. At the beginning of round 0, the initial condition is as follows: (1) the NG is defined—i.e., all UTs in FPs with links between them defined and (2) the beam graph is defined with each link assigned to a beam graph arc—i.e., initial global links-to-arcs map is defined with each SP's portion defined.

After the initial global state and each SP's partial knowledge of it is set, an attack against one of the SP System's UL beams takes place, which may be reported to the affected SPs only, and includes the UL beam attacked and the links affected. During round 0, after the attack, each affected UT can attempt to implement a set of actions to reestablish its lost links under SP direction. This process is carried out such that the reestablished links and/or inadvertently lost links are added to, or removed from, the appropriate beam graph arcs or LLL, and also such that the up-to-date SP links-to-arcs maps are available to each SP before the next round interval.

After round 0, at the beginning of interval n, each SP knows its interval n links-to-arcs map, which is the result of attacks or actions taken in interval n−1, and so can update its lost-links list by comparing it to its interval n−1 links-to-arcs map. The SP's interval n reward is computed. Then, an attack against one or more of the SP System's UL beams is initiated. The attack is known to the affected SPs only. During the rest of round n, each affected UT carries out actions based on SP direction. This process is carried out such that the reestablished links are added to, or removed from, the appropriate arcs, and also such that the up-to-date SP links-to-arcs mapping are available to each SP before the next round interval. The LLL is also updated.

Link Restoration

According to various examples, the controller SP has the responsibility of restoring lost links while taking into account the overall throughput of all affected beams, and so is configured to be able to determine and, at least indirectly implement, affected UT's repointing. The controller SP is incentivized through a reward structure to restore as many lost out-links that were carried by the attacked UL beam as possible while, at the same time, maintaining as many in-links as possible. The controller SP may carry out actions over all affected UTs. Thus, the controller SP may be configured to aggregate UT actions between the jammed UT and indirectly affected UTs. Links that cannot be restored or which are lost as a result of the restoration process are added to the lost links list (LLL).

A link restoration action is an action that restores some subset of attacked links and also deals with indirectly affected links. Assumptions may be made to limit complexity, if required, concerning controlled collateral loss of far-end UT (i.e., the Tx UTs and Rx UTs in FIG. 6) in-links and out-links and the in-links and out-links of UTs connected to them, and so on, described earlier as the cascading repointing problem. The resulting loss in throughput may be minimized through the reward structure and also through constraints on actions. One possible action may be defined as follows: let $\epsilon \geq 0$ be a possibly randomly drawn real number. Then, jammed UTs may repoint to a same-slot or different-slot beam, causing consistent repointings and calculated non-repointings in the cascade (except in the same-satellite case due to transparency), if and only if the relationship between the TP lost due to controlled loss of links (represented in total as $TP_{lost}$) and the TP of the restored out-links ($TP_{restored}$) is as follows:

$$TP_{lost} + \epsilon \leq TP_{restored}$$

This or suitable alternative strategies to deal with all jammed UTs in a FP can be defined. A simple metric for classifying jammed UTs is the relationship between the throughputs of the out-links, TPout, and the in-links, TPin. An exemplary criterion on whether or not to restore lost out-links is whether or not TPout>TPin. This criterion could be applied to all of the jammed UTs to obtain a possibly smaller set of UTs for link restoration. Another approach is applied to the pairs (TPout, TPin) over all jammed UTs: lexicographically (dictionary) order the pairs. Then, for typical UT distributions, near the top are the pairings for UTs that one would say should be restored, while the ones closer to the bottom can be ignored with less harmful effect. To limit restoration attempts, and enhance trial and error search, a stopping point in the list could be randomly defined, where a bias toward the bottom of the list (say) can be implemented (sampling according to a beta density is an option for this). This could provide a way of terminating an episode earlier than the time it takes to process all jammed UTs in the FP.

Reward Signal

The SPs receive revenue from customers for supporting links at a mutually agreed-to rate r ($/data rate unit), which may be the same for all SPs. A link therefore provides a revenue of rDR to an SP, where DR is the link's data rate. If the controller SP moves an attacked out-link or indirectly affected in-link to a different BP not owned by the link owner, a cost is imposed on the link-owner SP for restoration of the link such that $$r = r_O + r_{o\text{-}SP}$$

where $r_{o\text{-}SP}$ is the cost paid to the owner of the alternate BP for use of its DL beam, and where $r_O$ is the revenue kept by the link-owner SP. The controller SP retains the cost as reward since its satellite is used. If the link-owner owns the DL beam, then $r_{o\text{-}SP} = 0$ as one would expect.

Capacity Sharing

For each SP, user capacity (UC) refers to the capacity on a DL beam to be used by the SP's links. Spare capacity (SC) refers to capacity on a DL beam that can be used by the links of other SPs. Each SP advertises its SC settings. Given the reward structure and capacity sharing feature, this model, even in the simplest case of single-beam attacks, exhibits the game-theoretic aspect of multiagent systems in that it models self-interest in the form of imposed cost and latitude in choice of links to be restored, but also cooperation, since subsequent attacks can cause roles to change.

Reinforcement Learning

Iterative machine learning, such as reinforcement learning, may be applied to learn policies for link restoration action choice in the face of jamming attacks extended over time, where accumulated revenue based on data rate throughput may be an SP's reward for good performance.

Figure 7:
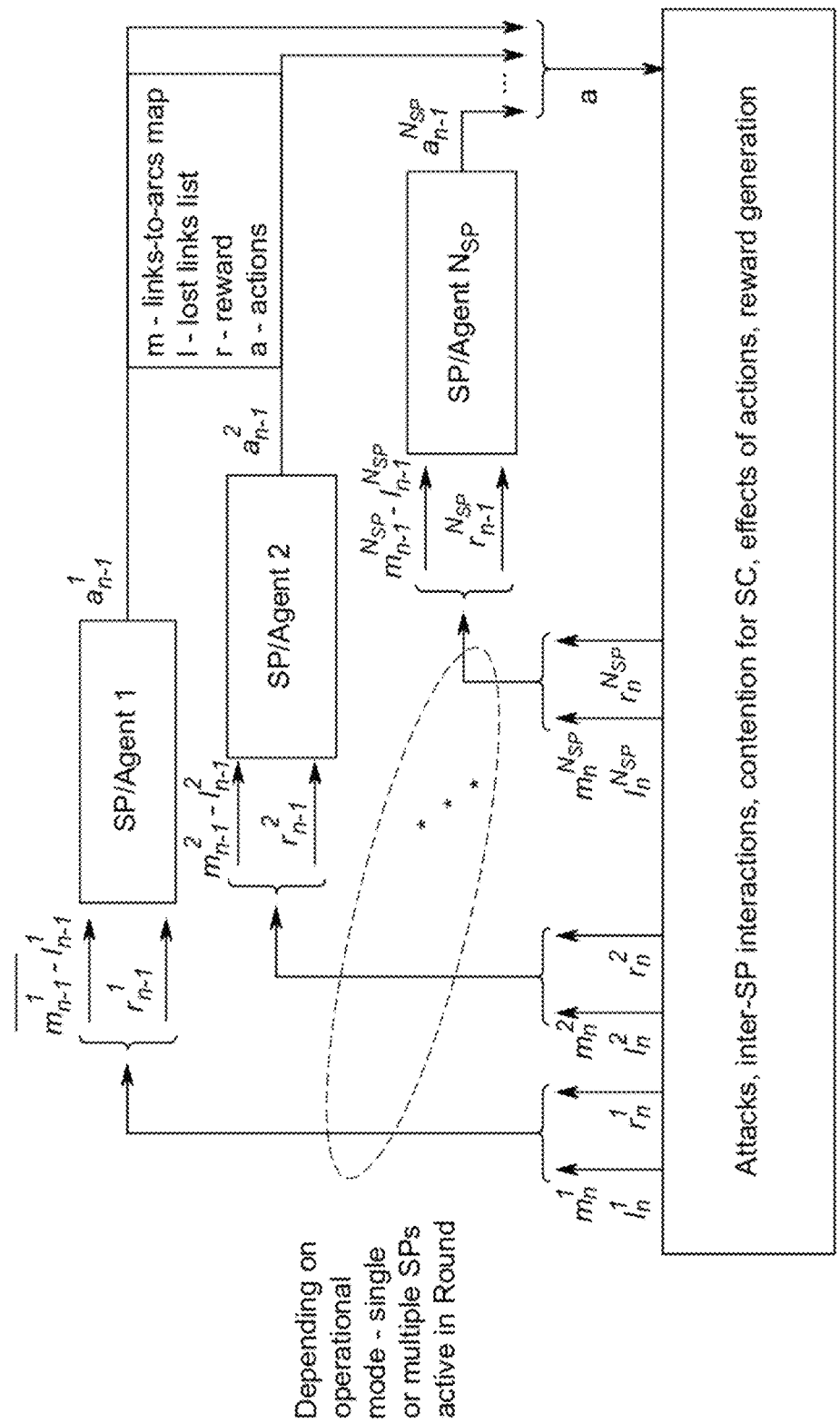
FIG. 7 illustrates an example of multi-service provider reinforcement learning.

FIG. 7 illustrates an example of multi-service provider reinforcement learning for a plurality of SPs to determine a set of actions in the face of an attack on one or more beams. The process can be implemented/performed in a planning mode, so as to learn the possible effects of attacks on a SATCOM network, where the network structure and usage and attacks are simulated, or may be implemented/performed operationally with an actual SATCOM network structure and usage in the face of actual loss of one or more beams, which may be due to adversarial action or for other reasons, including, for example, hardware and/or software failure (referred to for simplicity as an attack). Although shown with respect to multiple SPs, the same process can be applied to a single SP.

SPs have as inputs the links-to-arcs map for the network or portion of the network owned by the given SP, a lost links list that indicates links owned by the respective SPs that have been lost due to one or more attacks, and a set of rewards corresponding to a previous set of actions directed by the respective SPs. Complete knowledge of this and other data by all SPs may be modeled as can various levels of partial knowledge down to the case where only part of the data applicable to an SP is known to the SP. The links-to-arcs map may be based on predefined network structure and a current state of communication links, which may be determined based on feedback from UTs, from satellites, from other SPs, and/or from any sensors or other situational awareness resources. A lost links list can be determined based on a comparison of the beam paths of each link and knowledge of a lost beam (resulting from an attack or other cause). The set of rewards can be determined based on a measure of actual data rates of the set of links for an SP. With this information, each respective SP determines a set of actions, using a reinforcement learning algorithm, that seeks to maximize revenue for the SP by restoring one or more lost links. The sets of actions are either provided to the simulated SATCOM network or are implemented by the UTs owned by the respective SPs. The sets of actions include UT repointing for restoring at least some of the lost links to maximize revenue. The actions result in updated links-to-arcs map(s), updated lost links list(s), and updated sets of rewards that may be used for a next optimization iteration, including in the face of additional attacks. The set of rewards can be used to update the reinforcement learning model.

The approach for direct policy methods in general, not just policy gradient methods, is to parametrize the probability distribution of the state-action pair using an action preference function h(s, a; θ), where s is the state of the SP System, a is the action and θ is the policy parameter vector in $R_m$, where m is the dimension of the parameter space. Optionally, $$m=|B_{SP}|,$$

where $B_{SP}$ is the set of all DL beams owned by the SP.

In this exemplary policy gradient formulation, the preference function is defined to be linear in the features:

$$h(s,a;\theta)=\text{transpose}(\theta) \cdot \phi(s,a),$$

where the m-dimensional feature vector, ϕ(s, a), is defined as follows: For any DL beam, the available, unused power, $P_{av}$, and available, unused bandwidth, $B_{av}$, are known to the SP and are assumed nonzero. The power-bandwidth ratio is formed:

$$\tau pbr=P_{av}/B_{av}$$

assumed normalized to the ratio of total beam power-to-total beam bandwidth. These are the components of the feature vector ϕ(s, a) and each component is ∈ (0, 1).

The parametrized probability distribution is $$\pi(a \mid s; \theta) = \frac{\exp(h(s, a; \theta))}{\sum_b \exp(h(s, b; \theta))}$$

Here, the soft-max function is employed, and this policy parametrization is called the soft-max in action preferences parametrization.

The parametrized policy distribution leads to a policy gradient method of improving performance (total reward, proportional to throughput) implemented via Monte Carlo sampling and gradient ascent. Total reward performance is a function, J(θ), of the performance parameters, and the gradient ascent is of the form $$\theta(t+1)=\theta t+\alpha \widehat{\nabla J(\theta t)}$$

where $\widehat{\nabla J(\theta t)} \in \mathbb{R}^m$ is a stochastic, unbiased estimate of the gradient with respect to the parameter θt.

Performance improvement is determined by estimating the performance gradient with respect to the policy vector in the SP System environment where the effect of policy on the state distribution is unknown. The result making this possible is the policy gradient theorem, which shows that the performance gradient is proportional to the expected value of the product of the return, R(T), over a state-action-return episode $$S0,A0,R1,\ldots,S(T-1),A(T-1),RT,$$

and the gradient ∇ log(π(a|s; θ)). That is, $$\nabla J(\theta) \propto \mathbb{E}_\pi[R(T)\nabla \log(\pi(At|St;\theta))],$$

where $R(T)=\Sigma_{t=0}^T Rt$

The REINFORCE update is $$\Theta(t+1)=\theta t+\alpha R(T)\nabla \log(\pi(At|St;\theta))$$

Recall that the features are the normalized available power-to-available bandwidth ratios for all DL beams. There are two views of the features worth emphasizing: gradient search dimensionality reduction and expected behavior during simulation. The actions described above involve determining consistent connections between the list of possible beam repointings of the jammed UTs and the lists of possible beam repointings for far-end Tx UTs and Rx UTs. In reinforcement learning applied to SP Systems, the best connections are learned through trial and error probing of the possible repointings. Due to the selected features, the dimension of the search space for the gradient ascent algorithm is decreased from a dimension on the order of 3 times the number of jammed UTs to the number of local beams (since the attacks do not involve all beams in a large SP System). This is a significant reduction in typical SP System scenarios.

The models to be used in implementing SP/UT actions based on the assumptions described above will reflect a SP System model that is bandwidth and power efficient. The goal is that the spectral efficiency versus data rate and required received power versus data rate inputs result in normalized ratios of available power-to-available bandwidth (the components of the feature vector) that tend to be closer to unity than not on average. This ensures that rewards are consistent with those actions that maximize SP revenue and overall throughput, where TP maximization may be approached on average due to the cost and reward structure.

Determining Link Restoration Via Integer Linear Programming

According to various embodiments, systems and methods may implement a binary integer linear programming (ILP) optimization, wherein assignment of UT-to-beam is the binary relation, using a multiple knapsack problem formulation to aid intuition, which additionally promotes the use of alternative combinatorial optimization approaches. The multiple knapsack formulation developed herein is referred to as the Solver. The Solver may be implemented by, for example, network operations center 112 of satellite service provider 102 of FIG. 1 in step 204 of method 200 of FIG. 2. The Solver may be implemented by each of a plurality of satellite service providers, such as by satellite service provider 102 and satellite service provider 120. This is so because, prior to an attack or outage where interaction between SPs is modeled and may be required for shared resilience against common attack vectors, the Solver can determine the best configuration for each SP network based on internal requirements and preferences. The output in such cases includes, for example, the best UT beam assignments given data throughput goals or restrictions on the numbers of UTs per beam (e.g., a nearly uniform distribution across beams may be a goal). The Solver takes as input all required UT-to-UT links independent of satellite configuration, along with the beams each UT has access to (including out-of-user-band gateway beams), and information on how the SP's satellites are interconnected via gateways or crosslinks. Thus, given the structure and frequency reuse rules of the SP's system, which allows beam paths available to UTs in fixed footprints to be inferred, the Solver's output will meet the requirements and preferences of the service provider in the best way possible. Note that the Solver is not constrained to determine service to all UTs; this may not be possible in all cases, and one of the features of the Solver is that such solutions are allowed. When interaction between the SP systems is modeled wherein sharing of beam resources is agreed to by the SPs in order to increase resilience to attack by common adversaries, it is necessary to run the Solver with knowledge of all the SP networks, where the Solver is run by a single, separate agent (which could be one of the SPs). The key here is common coverage of footprints by the SPs, where the UTs of the SPs can share the footprints. With common knowledge of the SP networks, which is input to the Solver just as it is when the Solver is used independently by the SPs, the Solver can determine alternative beam paths due to an attack on a beam or beams of one or more SPs. The restoration of jammed links and retainment of collaterally affected links is carried out by the Solver using the individual SP network inputs and the common coverage of footprints. The additional input needed is a set of rules on SP interaction. In various embodiments, the rules are cast into an economic framework where revenue is obtained by each SP due to the data service provided to its customers, i.e., the users of the user terminals. That revenue is shared with the SP owner of beams when an alternative beam path for a jammed link is determined by the Solver. In this case, the revenue of the beam owner SP is increased by the cost paid by the SP owner of the jammed link. All of this is carried out by the Solver software for all of the affected user terminals using the provided networks.

According to the principles described herein, a UT is considered covered by a beam if the beam covers the UT's footprint. This means the UT can transmit and receive via the beam if commanded to do so by its SP. This includes the case in which a UT is communicating, or operating, on a beam. A set of beams covers a set of UTs if each UT is covered by at least one of the beams.

Consider the directed network graph (NG) with UTs as nodes. There can be multiple arcs between UTs of different data rates and priorities with no self-directed arcs. This graphical structure is a weighted multidigraph without self-loops, where the weights are the data rates. In the multiple knapsack problem formulation and related graph theoretical analysis, focus is on the aggregate, weighted digraph, G=(U, D(U)) found by summing the DRs of all links in a single direction between pairs of UTs.

For a positive integer q, let $\mathbb{Z}_q = \{1, 2, \ldots, q\}$. For a set $A = \{a_1, a_2, \ldots, a_q\}$, any nonempty subset has the form $A^{q'} = \{a_{i_1}, a_{i_2}, \ldots, a_{i_{q'}}\}$, where $i_1 < i_2 < \ldots < i_{q'}$ and $q' \leq q$. Set $A^{q'} = \phi$ (the empty set) if $q'=0$. Note that this notation applies to a well-defined subset which remains valid throughout an iteration of the computation described herein. Also, $A^q = A$.

Let $n_{SP}$ be the number of SPs. Let $$U = \bigcup_{j=1}^{n_{SP}} U_j$$

be the set of UTs. For each $j \in \mathbb{Z}_{n_{SP}}$, the set $U_j$ contains an indexed list of the $n_j$ UTs owned by $SP_j$, $U_j = \{u_j^1, u_j^2, \ldots, u_j^{n_j}\}$. The number of UTs as well as the UT-SP ownership relationship remains constant throughout an attack/outage scenario, although some UTs may not remain operating on any beam. The number of user terminals is $N = \sum_{j=1}^{n_{SP}} n_j$.

Let n be the number of slots. Let $$B = \bigcup_{s=1}^{n} B_s$$

be the set of beams. For each $s \in \mathbb{Z}_n$, the set $B_s$ contains an indexed list of the $m_s$ beams from slot s, $B_s = \{b_s^1, b_s^2, \ldots, b_s^{m_s}\}$. The number of beams is $M = \sum_{s=1}^{n} m_s$.

Since SPs can own one or more slots, the SP owner of slot $s \in \mathbb{Z}_n$ is defined to be $o(s) \in \mathbb{Z}_{n_{SP}}$.

An assumption can be made that the beams in B cover the UTs in U.

A jamming attack on a set of uplink beams can be modeled by marking beams as jammed and identifying the UTs covered by the jammed beams (i.e., the jammed UTs). Recalling the relevant notation from above, the beams that are not attacked are $$B^{M'} = \bigcup_{s=1}^{n} B_s^{m'_s e} \text{ where } M' = \sum_{s=1}^{n} m'_s$$

is the number of remaining beams. The set of UTs that remain covered after the attack is $U^{N'} = \bigcup_{j=1}^{n_{SP}} U_j^{n'_j}$ which contains both jammed and unjammed UTs, unless all jammed UTs are not covered after the attack, which is a case covered by various embodiments of the systems and methods described herein.

For an arbitrary set of links l, define DR(l) to be the sum of the data rates of the links in l, which is the throughput of l. Given a beam b, its residual capacities are denoted rescap(UL(b)) and rescap(DL(b)). Define $L_j^k / l_j^k$ for $j \in \mathbb{Z}_{n_{SP}}$, $k \in \mathbb{Z}_{n_j}$ to be the set of links for which UT $u_j^k$ is the source/target, respectively.

In terms of the multiple knapsack problem formulation, the UTs in $U^{N'}$, which are all the remaining UTs after an attack or outage, play the role of the items, and all remaining beams in $B^{M'}$ play the role of the knapsacks. Specifically, the link pairs $(l_j^{k_q}, L_j^{k_q})$, $j \in \mathbb{Z}_{n_{SP}}$ and $q \in \mathbb{Z}_{n'_j}$, are the items and the beam pairs $(DL(b_s^{k_p}), UL(b_s^{k_p}))$, $s \in \mathbb{Z}_n$ and $p \in \mathbb{Z}_{m'_s}$, are the knapsacks and all links in $l_j^{k_q}$ must be able to be carried by $DL(b_s^{k_p})$ and all links in $L_j^{k_q}$ must be able to be carried by $UL(b_s^{k_p})$.

The multiple knapsack problem formulated herein can be solved using a constraint satisfaction programming (CSP) technique, wherein a set of solutions, called feasible solutions, is determined. The feasible solutions satisfy constraints (called hard constraints) that must be satisfied. Then, an objective function is applied, which can distinguish solutions reflecting preferences of SPs and/or which impose rules of interaction between service providers, such as pricing agreements for the use of the residual capacity of one SP by another SP to provide communications services to its customers. The feasible solutions are determined during Phase 1 of the computation. The objective function is applied during Phase 2 of the computation. The combined process combining Phase 1 followed by Phase 2 is herein called the Solver.

Given the previous notation and definitions, define the knapsack assignment function to be $$x_{s,k_p|j,k_q} = \begin{cases} 1, & \text{if } u_j^{k_q} \text{ is assigned to } b_s^{k_p} \\ 0, & \text{otherwise} \end{cases}$$

where $j \in \mathbb{Z}_{n_{SP}}$, $q \in \mathbb{Z}_{n'_j}$, $s \in \mathbb{Z}_n$ and $p \in \mathbb{Z}_{m'_s}$.

Given the previous notation and definitions, the hard constraints may be:

$$\sum_{j=1}^{n_{SP}} \sum_{q=1}^{n'_j} DR(L_j^{k_q}) x_{s,k_p|j,k_q} \leq \text{rescap}(UL(b_s^{k_p}))$$

$$\sum_{j=1}^{n_{SP}} \sum_{q=1}^{n'_j} DR(l_j^{k_q}) x_{s,k_p|j,k_q} \leq \text{rescap}(DL(b_s^{k_p}))$$

where $s \in \mathbb{Z}_n$ and $p \in \mathbb{Z}_{m'_s}$, and $$\sum_{s=1}^{n} \sum_{p=1}^{m'_s} x_{s,k_p|j,k_q} \in \{0, 1\},$$

where $j \in \mathbb{Z}_{n_{SP}}$ and $p \in \mathbb{Z}_{n'_j}$. The first two constraints ensure that there is sufficient UL and DL residual capacity in the available beams. The third constraint ensures that each UT's throughput is assigned to at most one beam (some UTs may not be restored/retained).

In various embodiments, SPs own UTs and satellites (slots). SPs own the links between their UTs. SPs receive revenue from their customers for providing data services in the form of links between their UTs. In a SP System state without, or prior to, an attack on or disruption to the SP System, all of an SP's UTs are carried by satellites owned by that SP. After an attack or disruption, an SP's UTs can repoint to alternative beams of the attacked satellite or to alternative satellites owned by the pre-attack SP or by other SPs.

In various embodiments, an SP derives revenue by providing services in the form of links to its customers. This is a function only of the SP UT throughput and is paid by the customers no matter how it is carried. Costs incurred by an SP are expressed as fractions of the SP's revenue. Define $r_i^u$ to be this revenue rate (currency units/s) for $SP_i$, where the superscript u means the revenue is derived only from $SP_i$'s UT throughput and is collected regardless of which SP carries the data. $SP_i$ also derives revenue when other SP UT throughput is carried by its beams; this is denoted $r_i^b$, where the superscript b indicates that UT throughput of other UTs is carried on $SP_i$'s beams. Lastly, it costs $SP_i$ to have its UT throughput carried by other SP's beams or, in various embodiments, by its own beams. This cost (currency units/s) is denoted $c_i$.

In various embodiments, SPs charge their customers for the data throughput provided, at a price which can be negotiated with customers and influenced economically, or otherwise, by the pricing of other SPs. The resulting revenue rate to $SP_i$ can be set by an SP-dependent conversion factor, $\alpha_i$ (e.g., currency units per bit), that converts throughput measured in data rate (e.g., bits/s) to revenue measured in, for example, currency units per second. The conversion factor is a price per bit, sometimes referred to a pricing. For the throughput (TP) provided by the out-links $L_i^k$ of UT $u_i^k$, for $i \in \mathbb{Z}_{n_{SP}}$, $k \in \mathbb{Z}_{n_i}$, the revenue rate is $$\sigma_i^k = \alpha_i DR(L_i^k).$$

The use of out-links as the basis for charging customers is justified, in various embodiments, as follows. The set of all links leaving a UT are all the links of interest for revenue, since all UTs transmitting to it are owned by the same SP, and this includes all inter-satellite links (ISLs) in the case that inter-satellite data traffic is provided for via gateways or crosslinks. Hence, all in-links to the UT are accounted for. In various embodiments, other units of information, instead of bits, and time, instead of seconds, can be used.

In various embodiments, costs for use of SP beams (SP1) by SPs who do not own the beams (SP2) is a fraction of the revenue rate paid to the latter (SP2) by their customers. This fraction is a function of the SPs involved (SP1 and SP2).

In various embodiments, a fractional cost matrix is introduced to describe the fractional cost incurred when a UT moves, due to a jamming attack or outage, to a beam not owned by the UT's SP. The fractional cost matrix elements, denoted by $\gamma_{sj} \geq 0$, where $j \in \mathbb{Z}_{n_{SP}}$ and $s \in \mathbb{Z}_n$, may be negotiated between the SPs specified by the subscripts. Each determines the cost rate paid to $SP_i$, where $o(s)=i$, by $SP_j$, where $j \neq i$, for UTs owned by $SP_j$ to operate on $SP_i$'s beams. Note that the rows of the matrix correspond to the slots $s \in \mathbb{Z}_n$ and the columns correspond to $SP_j$, $j \in \mathbb{Z}_{n_{SP}}$, as follows, where $\gamma_{sj}=0$ if $o(s)=j$:

$$\Gamma = [\gamma_{sj}]_{s \in \mathbb{Z}_n, j \in \mathbb{Z}_{n_{SP}}}.$$

The matrix is in general non-square, since $n_{SP} \leq n$, where it is expected that $n_{SP} < n$ in various embodiments. This matrix is square when n slots are owned by $n_{SP}=n$ SPs, that is, by one owner per slot. Additionally, the cost to $SP_j$ for its links to be carried by $SP_i$'s slots could be different than the case with roles reversed for various reasons, such as differing residual capacities and available path diversity; thus, the laws of supply and demand will affect SP interaction and can be analyzed within this mathematical programming framework. Note that Γ will be used to derive the cost transfer matrix A herein, which will provide cost to one SP for the use of beams from another.

In various embodiments, a nonzero cost for movement of an SP's UTs between its own beams and satellites is referred to herein as a self-cost (or fractional self-cost). One reason for self-costs could be rebates to customers for interruption of services. Moreover, these self-costs, in various embodiments, can be distinct from each other depending on whether a moved UT remains on the same pre-attack satellite or moves to a different satellite post-attack. If these are covered and distinguished, then the approach in various embodiments can differ. Referring to the above definition of the fractional cost matrix Γ, recalling that, when $SP_j$'s UT is moved to slot s with owner o(s)=i, $\gamma_{sj}$ is assumed to reflect the cost to $SP_j$ for use of $SP_i$'s beam. Self-costs may be added to the formulation. One method for distinguishing these self-costs is to augment the zero fractional cost element in Γ for a slot (row) s and column j such that o(s)=j, with two additional elements, one for each of these two different self-costs:

- $\gamma_{sj}^1$, which is the cost for moving UTs $u_j^{k_q}$, $q \in \mathbb{Z}_{n'_j}$, to beams on the same satellite that $u_j^{k_q}$ was assigned to prior to the attack, and
- $\gamma_{sj}^2$, which is the cost for moving UTs $u_j^{k_q}$, $q \in \mathbb{Z}_{n'_j}$, to beams on a different post-attack satellite owned by $SP_j$ than the one $u_j^{k_p}$ was assigned to prior to the attack.

In the special case of one owner for each slot, i.e., the case in which the cost matrix is a square matrix, the zero elements in the diagonal of Γ are augmented by the self-costs $\gamma_{sj}^1$, while $\gamma_{sj}^2 = 0$ because each SP owns only one slot.

The revenue rate for $SP_i$ is expressed in two terms. The first, $r_i^u$, is the revenue rate for providing the data services to its customers over any SP beam. The second term is the revenue rate for carrying other SP UTs on its beams, $r_i^b$. Prior to an attack, $r_i^b = 0$. The total revenue rate for $SP_i$ is $$r_i = r_i^u + r_i^b.$$

The cost rate to $SP_i$ for its use of other SP beams plus self-costs is denoted $c_i$, which is zero prior to an attack. The profit rate for $SP_i$ is $$p_i = r_i - c_i.$$

In various embodiments, definition of an objective function can be left to the specific application since the CSP approach views objective functions as a way to distinguish among feasible solutions, providing a way to reflect collective goals and preferences of the SPs. A familiar objective function is the sum of the profits, but a host of other objective functions are allowed with this approach.

Recall that UTs are indexed by SP, and all covered UTs after an attack owned by $SP_i$ are written as $u_i^{k_p}$, where p is an integer between 1 and the number of remaining, covered UTs, $n'_i$, belonging to $SP_i$. The revenue rate to $SP_i$ for the customer data service provided by UT $u_i^{k_p}$, carried on any SP beam, is $$\sigma_i^{k_p} = \alpha_i DR(L_i^{k_p}).$$

It follows that $$r_i^u = \sum_{p=1}^{n'_j} \sigma_i^{k_p}.$$

The pre-attack revenue rate for $SP_i$ is when $n'_i = n_i$. The Solver computes this for comparison prior to execution of a scenario run.

To determine the form of $r_i^b$, a $n_{SP} \times n_{SP}$ cost (transfer) matrix may be used:

$$\Lambda = [\lambda_{ij}]_{i,j \in \mathbb{Z}_{n_{SP}}},$$

where $\lambda_{ij}$ = total revenue rate transferred to $SP_i$ from $SP_j$, $j \neq i$.

For $j \neq i$:

$$\lambda_{ij} = \sum_{s:\, o(s)=i} \sum_{p=1}^{m'_s} \sum_{q=1}^{n'_j} \gamma_{sj} \sigma_j^{k_q} x_{s,k_p|j,k_q}$$

To see why this holds, consider a slot s such that o(s)=i. The double sum is over all possible assignments, by the Solver, of the remaining UTs $U_j^{n'_j} = \{u_j^1, u_j^2, \ldots, u_j^{n'_j}\}$ to the remaining beams, $B_s^{m'_s} = \{b_s^1, b_s^2, \ldots, b_s^{m'_s}\}$. The knapsack assignment function, $x_{s,k_p|j,k_q}$, distinguishes a $u_j^{k_q}$ that is assigned, during Solver search, to a particular beam $b_s^{k_p}$ from those that are not. (Note that the Solver accounts for any s with $m'_s = 0$ implying $B_s^{m'_s} = \phi$, or any j with $n'_j = 0$ implying $U_j^{n'_j} = \phi$, prior to implementing this sum. If such a check is positive, the summing operation is terminated. This statement holds in similar summing operations developed below.) For clarity, recall that $$\gamma_{sj} \sigma_j^{k_q} = \gamma_{sj} \alpha_j DR(L_j^{k_q}),$$

and observe that $\gamma_{sj} \alpha_j$ is a fraction of a currency unit that $SP_j$ pays $SP_i$ for transmitting a bit over $SP_i$'s beam; when this is multiplied by the data rate throughput of UT uu q, the result is a fraction of revenue rate transferred from $SP_j$ to $SP_i$. The revenue rate for carrying other SP UTs on its beams is given by:

$$r_i^b = \sum_{\substack{j=1 \\ j \neq i}}^{n_{SP}} \lambda_{ij}$$

The revenue rate for each $SP_i$ has been determined through $r_i = r_i^u + r_i^b$. This involves only its own data service and revenue from other SPs. The cost rate, due to its use of other SP beams and the two possible self-costs of its own beams, may be determined. As indicated, this cost rate, $c_i$, has three terms. The first is the cost rate, $\beta_i$, paid by $SP_i$ for the use of other SP beams to carry its customer data. The second is the self-cost rate, $\beta_i^1$, which is the cost for moving $SP_i$ UTs to beams on the same post-attack $SP_i$ satellite that they were operating on prior to attack. The third term is the self-cost rate, $\beta_i^2$, which is the cost for moving $SP_i$ UTs to beams on different post-attack $SP_i$ satellites than they were operating on prior to attack. The cost rate is, then:

$$c_i = \beta_i + \beta_i^1 + \beta_i^2.$$

To determine the first term, the Solver searches over knapsack assignments of $SP_i$ UTs to be carried by beams of other SPs. The cost rate to carry $SP_i$'s UT $u_i^{k_q}$, for some $q \in \mathbb{Z}_{n'_i}$, over slot s such that o(s)≠i, is $\gamma_{si} \sigma_i^{k_q}$, which is independent of which of the other SP beams, $b_s^{k_p}$, $p \in \mathbb{Z}_{m'_s}$, is used; but it may depend on the slot. It follows that $$\beta_i = \sum_{s:\ o(s)\neq i} \sum_{p=1}^{m'_s} \sum_{q=1}^{n'_i} \gamma_{si} \sigma_i^{k_q} x_{s,k_p|i,k_q}$$

Next, the self-cost rate, $\beta_i^1$, is developed. In this case, the Solver searches over UT assignments to beams in the same $SP_i$ slot that the UTs were assigned to prior to a jamming attack. Prior to attack, let $U_i^s \subset U_i$ be those UTs assigned to slot s with $o(s)=i$. The set of UTs in $U_i^s$ remaining after the jamming attack is $(U_i^s)'$. Let $B'_s \subset B_s$ be the set of beams from slot s remaining after the attack. Let $\sigma_i^u$ be the revenue rate earned by $SP_i$ for the total data rate out of UT u. Lastly, let $x_{b|u}$ be the knapsack assignment function such that $x_{b|u}=1$, if UT u is assigned to beam b, and $x_{b|u}=0$ otherwise. In this case, after attack, $u \in (U_i^s)'$ can only be assigned to $b \in B'_s$ to remain on the same slot after attack. Then, recalling the definition $\gamma_{si}^1$:

$$\beta_i^1 = \sum_{s:\ o(s)=i} \sum_{b \in B'_s} \sum_{u \in (U_i^s)'} \gamma_{si}^1 \sigma_i^u x_{b|u}$$

The third term is the second self-cost term, $\beta_i^2$, which covers Solver search over assignments of $SP_i$'s UTs to beams in $SP_i$'s slots with the restriction that, if a UT moves, it must move to a new slot. Let $O_i=\{s:o(s)=i\}$. If $|O_i|=1$, then $\beta_i^2=0$. Therefore, assume $|O_i|>1$. In this case, after attack, $u \in (U_i^s)'$ can only be assigned to $b \in \cup_{t \in O_i - \{s\}} B'_t$. Hence, recalling the definition $\gamma_{si}^2$:

$$\beta_i^2 = \sum_{s \in O_i} \sum_{b \in \cup_{t \in O_i - \{s\}} B'_t} \sum_{u \in (U_i^s)'} \gamma_{si}^2 \sigma_i^u x_{b|u}$$

To address the problem of the cascade of UT pointing change requirements due to pointing changes of a specific set of UTs, a review of assumptions on SP-controlled satellite switching and the SP control of UTs is needed. These are important considerations since typical satellites, especially present-day transponders, require changes to the switching of uplink-to-downlink modulated carrier signals to be done via command signals from a ground command terminal. This is less of a problem for onboard processing satellites which automatically switch packets or streams of data bits, but some level of commanding from the ground may still be required even in this case. Also, most SP SATCOM systems require some level of control signaling directly from, for example, the network operations center 112 of satellite service provider 102 of FIG. 1 to control UT pointing, or in some equivalent or related method of UT control. In both cases, operational complexity and response time are impacted.

In some embodiments, transparent onboard satellite switching may be assumed. This means that the onboard switch is nonblocking. Therefore, the only constraints are due to UL and DL residual capacity limitations and the path diversity limitations due to beam coverage design.

With reference to FIG. 6, and recalling the transparent satellite switch assumption, if a UT, here referred to as the UT-of-interest, or UT-I, is operating on a given beam and repoints for any reason, in-links to and out-links from the UT can be disrupted. There are two cases to consider:
1. UT-I repoints to a new beam covering it which is on the same satellite as it is operating on, or
2. UT-I repoints to a new beam covering it which is on a different satellite, in a different slot.

In various embodiments, it is desirable to know which UTs will be affected by a repointing of a specific set of UTs. In the case of a SP SATCOM system, the UTs operating over a specific beam are of particular interest, although systems and methods are not restricted to this case.

In various embodiments, disruption of network operations is a concern to service providers/operators. System and methods described herein can address fundamental SATCOM network disruption through qualitative graph theoretic consideration of the problem of cascade of pointing change requirements due to an attack or outage. The Solver provides quantitative assessment of the effect of this disruption. This is best addressed in the single SP/single slot case, wherein it is only necessary to allude to potential movement of UTs to beams in an adjacent slot. Therefore, the potential effect on the initial network is identified in its pre-attack state. Under these assumptions, the set of UTs is $U=\{u_1, u_2, \ldots, u_N\}$ The set of beams is $B=\{b_1, b_2, \ldots, b_M\}$.

Assume B covers U. Recall the aggregate, weighted digraph, $G=(U,D(U))$ found by summing the DRs of all links in a single direction between pairs of UTs. Here the arcs $D(U)$ are the aggregate links. For an arc $(u,v) \in D(U)$, define $u \rightarrow v$ to mean that u is adjacent to v in G (i.e., UT u transmits to UT v). Additionally, v is adjacent from u. The underlying undirected graph, $\eta(G)=(U,E(U))$, where the undirected edges in $E(U)$ are obtained from G by replacing arcs $(u,v)$ or symmetric arcs $(u,v)$ and $(v,u)$ with an edge $uv \in E(U)$. The weight assigned to the edge in the symmetric-arcs case is unimportant since only connections between UTs are of concern.

A path in an undirected graph is a sequence of nodes which can be assumed, without loss of generality, to be distinct, unless the beginning node and end node are the same node. Observe that the reverse path is a path between the end node and beginning node. Also, two paths with the end node of the first equal to the beginning node of the second is a path between the beginning node of the first and the end node of the second. The trivial path consisting of a single node is considered a path. Two nodes are said to be connected if there is a path between them.

A component of an undirected graph is a connected subgraph that is not a subgraph of any connected subgraph. Thus, a component is maximal with respect to connectivity. By definition, a weakly connected component (WCC) of G is a component of $\eta(G)$.

Although systems and methods do not directly determine WCCs, it is well-known that the component in $\eta(G)$ containing any $u \in U$ can be determined using the basic breadth-first search algorithm in $O(n+m)$, where m is the number of edges. Recall that all components of an undirected graph form a partition of the nodes of the graph. This means that the components are mutually disjoint and that their union is equal to the set of nodes of the graph.

These definitions and facts, about the underlying graph $\eta(G)$ formed from the digraph $G=(U,D(U))$, which is in turn formed from a single-SP SATCOM network (weighted multidigraph) for a single satellite, enables investigations important to resilient operations of the network. Moreover, they enhance intuition when dealing with mathematical programming tools, such as the Solver, which work well without the simplifying assumptions needed for theoretical analysis and human understanding. The following proposition enhances this intuition and, moreover, fundamentally characterizes the problem of the cascade of UT pointing change requirements:

Proposition 1: In a weakly connected component of G, if any UT repoints to and receives service from an alternative satellite, then, to retain all links connecting UTs in the WCC, all the other UTs in the WCC must repoint to and receive service from the same alternative satellite. Proof: Assume u∈U repoints to and can receive service from an alternative satellite. Let v be any other UT in the same WCC component as u. Then, there is a path in η(G) from u to v. Two adjacent UTs, $w_1$ and $w_2$, on this path are such that either $w_1$ transmits to $w_2$ ($w_1 \rightarrow w_2$) or $w_2$ transmits to $w_1$ ($w_1 \rightarrow w_2$), or both, by the definition of η(G). In any of these cases, a link UL part on an UL beam is followed by a DL part on a DL beam, where both beams are on the same satellite. Hence, both UTs must be pointed to the same satellite to preserve their communications. Considering UTs in consecutive pairs along the path, starting with u, it follows that all UTs on the path, including v, must point to the same alternative satellite to retain all links on the path. Thus, all UTs in the component have to point to the same alternative satellite, since there is a path to each of them from u.

In various embodiments, it is not necessary to retain all affected links when a given UT, or set of UTs, repoints to an alternative satellite due to a jamming attack or outage. The Solver defined herein can determine the better combinations of UT repointing and link loss, short of total retainment, in order to meet objectives, if sufficient path diversity and residual capacity is available.

In various embodiments, mathematical programming tools, such as the Solver, can be used to provide quantitative metrics, such as throughput or number of UTs affected, due to the expanding, cascading effect of a jammed beam, or other attacked sets of UTs. Qualitative results can be developed that can guide use of, and aid in understanding the output of, the Solver. Define $A_0$ to be the set of UTs operating on a beam $b_0 \in B$. Define, for k=1, 2, . . . , $$A_k = \{u \in U : \exists v \in A_{k-1} \text{ s.t. } u \rightarrow v \text{ or } v \rightarrow u\}.$$

The condition for inclusion of u in $A_k$ is that some $v \in A_{k-1}$ is adjacent to u in η(G); in other words, uv is an edge in η(G). The $A_k$ can be thought of as path-distance expanding layers (path distance=number of η(G) edges), analogous to the layers of an onion. Thus, beginning with $A_0$, the Solver creates the layers of the 'onion,' $A_0, A_1, \ldots, A_k$, which describe the cascading effect if $b_0$ is jammed. Since U is finite, there exists an r such that $A_r \neq \phi$ and $A_{r+1} = \phi$.

Definition: Given a beam b, a link whose beam path is UL(b) followed by DL(b) is called an in-beam link.

Recall that there are no links between a UT and itself. Thus, an in-beam link can exist if and only if there are at least two UTs operating on a beam. If an in-beam link exists operating on $b_0$, then $A_o \cap A_1 \neq \phi$, by definition of $A_1$. Likewise, for k>1, if there is $u \in A_{k-1}$ which is adjacent to, or from, some $v \in A_{k-1}$, then $A_k \cap A_{k-1} \neq \phi$, by definition of $A_k$. Recall the following: a (binary) relation on a set S is a subset of S×S. An equivalence relation is reflexive (s~s, for all s∈S), symmetric (s~t⇔t~s, for all s, t∈S), and transitive (s~t and t~w⇒s~w, for all s, t, w∈S). An equivalence relation partitions S into disjoint equivalence classes, where two elements of S are equivalent if and only if they belong to the same equivalence class.

Proposition 2: Define the connectivity relation u~v between u, v∈$A_0$ to mean that there is a path between u and v in η(G). Then, the relation ~ is an equivalence relation on $A_0$. This proposition follows easily from the definition and properties of a path provided earlier. Given u∈U, define $C_u$ to be the component of η(G) containing u, i.e., $C_u$ is the WCC in G containing u. Let $\mathcal{P}_0$ be the partition of $A_0$ due to the connectivity relation. If u, v∈$A_0$ are in the same element of $\mathcal{P}_0$, then $C_u = C_v$, since u and v are connected and a component in η(G) is maximal with respect to connectivity. The next proposition follows from this discussion and is fairly obvious. It is important because it lends intuitive appeal to these concepts.

Proposition 3: For each P∈$\mathcal{P}_0$, choose a representative element u∈P and let P=$P_u$. Then, $P_u = A_o \cap C_u$.
Proof: Let v∈$P_u$. Then v is connected to u. Therefore, v∈$C_u$, and so $P_u \subset A_o \cap C_u$. If v∈$A_o \cap C_u$, then v is connected to u in $A_o$, which implies that v∈$P_u$. The following proposition shows that, if the Solver constructs the onion layers $A_0, A_1, \ldots, A_r$, then all WCCs $C_u$, u∈$A_0$, are implicitly determined. Note that graph complexity and processing limitations can limit how many layers are implicitly determined.

Proposition 4: Let $A = \cup_{k=0}^{r} A_k$. The WCC $C_u$ of G containing u, for some u∈$A_0$, is such that $C_u \subset A$.
Proof: Let v∈$C_u$. Then, it is well-known that there is a path of distinct UTs from u to v in η(G) of some length, say p: $uu_1u_2 \ldots u_{p-1} v = u_p$. Starting with $u_1$, it could be true that $u_1 \in A_0$, due to the existence of in-beam links. If all of the rest of the UTs in the path are also in $A_0$, then the conclusion holds. Otherwise, there is a smallest q such that $u_q \notin A_0$ and $u_q \in A_1$. An identical argument can be repeated in succession until the conclusion is reached that v∈$A_k$ for some k≥1, implying that v∈A, and so $C_u \subset A$.

Proposition 5: Let $A = \cup_{k=0}^{r} A_k$. Then, A is a WCC of G if and only if all UTs in $A_0$ are connected in η(G).
Proof: If A is a WCC, then any two UTs in A are connected in η(G). Since $A_0 \subset A$, any two UTs in $A_0$ are connected. Conversely, if all UTs in $A_0$ are connected in η(G), then $C_u = C_v$ for all u, v∈$A_0$. Define WCC C such that $C = C_u$ for all u∈$A_0$. By Proposition 4, $C \subset A$. But observe that A is connected: if u, v∈A, then both u and v are connected to UTs in $A_0$. Since all UTs in $A_0$ are connected, u and v are connected. Therefore, since C is maximal with respect to connectivity, C=A, and so A is a WCC.
We conclude that the Solver can explicitly determine A if all UTs in $A_0$ are connected and sufficient computational power is available to deal with the complexity of G.

Figure 9:
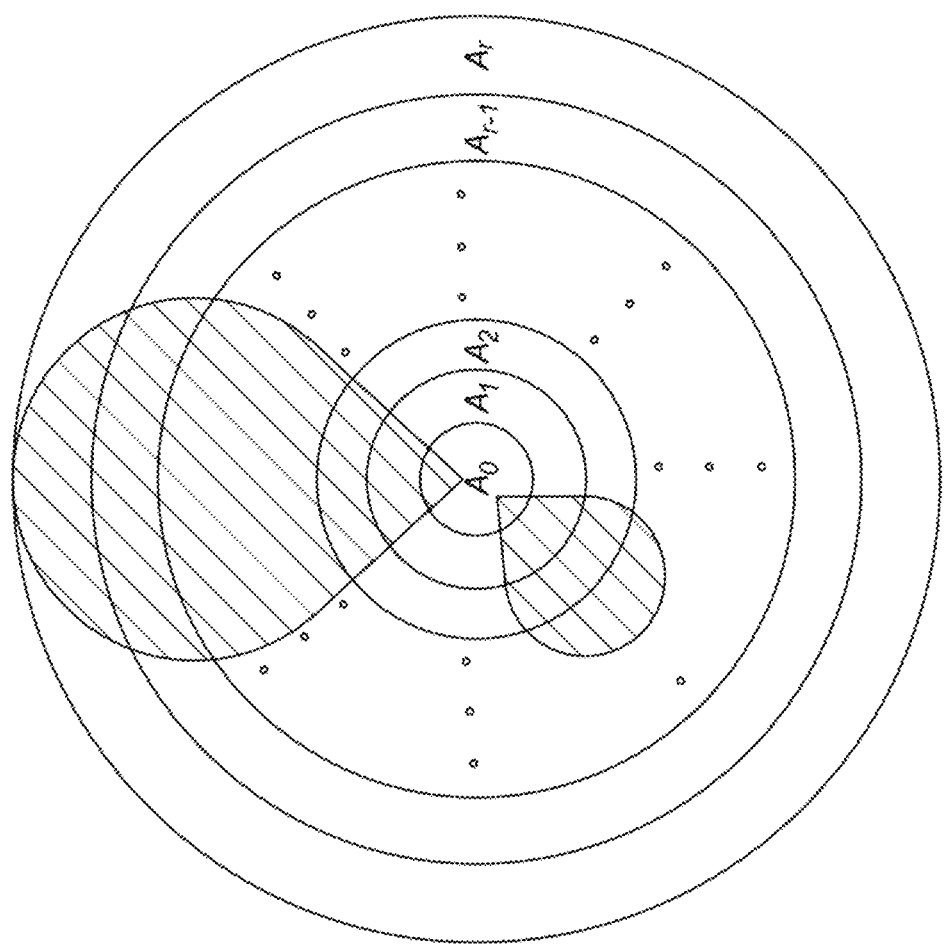
FIG. 9 illustrates an onion map of a beam and contained weakly connected components.

The 'onion' $A = \cup_{k=0}^{r} A_k$ defined above is depicted in FIG. 9. FIG. 9 is referred to as the onion map of the beam $b_0$. It represents all of the UTs that are impacted by a jamming attack or outage of the beam. The two 'bubbles' represent two WCCs generated from connected UTs operating on the beam. The regions common to the two WCCs and $A_0$ represent two of the disjoint elements of the partition referenced in Proposition 3. The set of all elements of the partition cover all of $A_0$ as proved above. By Proposition 4, FIG. 9 is correct in showing the two representative WCCs as contained in A. Some of the WCCs do not intersect all of the layers, as illustrated in FIG. 9 and as argued in the proof of Proposition 4. To reiterate this point, a simple example shows why: assume two UTs operating on the beam (i.e., they are in $A_o$) are endpoints of an in-beam link. If one of them transmits a link to a UT outside of $A_o$, and there are no other links involved, then the three UTs form a WCC that intersects only $A_0 \cup A_1$. A itself can be a WCC if all UTs operating on $b_0$ are connected, that is, all aggregated out-links from UTs in $A_0$ form the initial edges of undirected paths which eventually connect back to all UTs in $A_0$.

UTs transmitting or receiving ISLs via a relay gateway or crosslink are included in systems and methods related to the cascade problem for a single satellite, i.e., the 'onion map' of a beam. This is clear since a gateway or crosslink connection terminates repointing requirements.

The Solver can generate the layers of the 'onion' and compute link restoration and retainment relative to its layers when multiple beams are attacked across multiple satellites of a SP SATCOM system. This is true because the mathematical formulation places no restrictions on number of beams or number of satellites, including connections via gateways and/or crosslinks between separate coverage areas, with gateways as hubs in hub-spoke networks also included. The only restriction is due to network complexity relative to available computational capacity.

Figure 10:
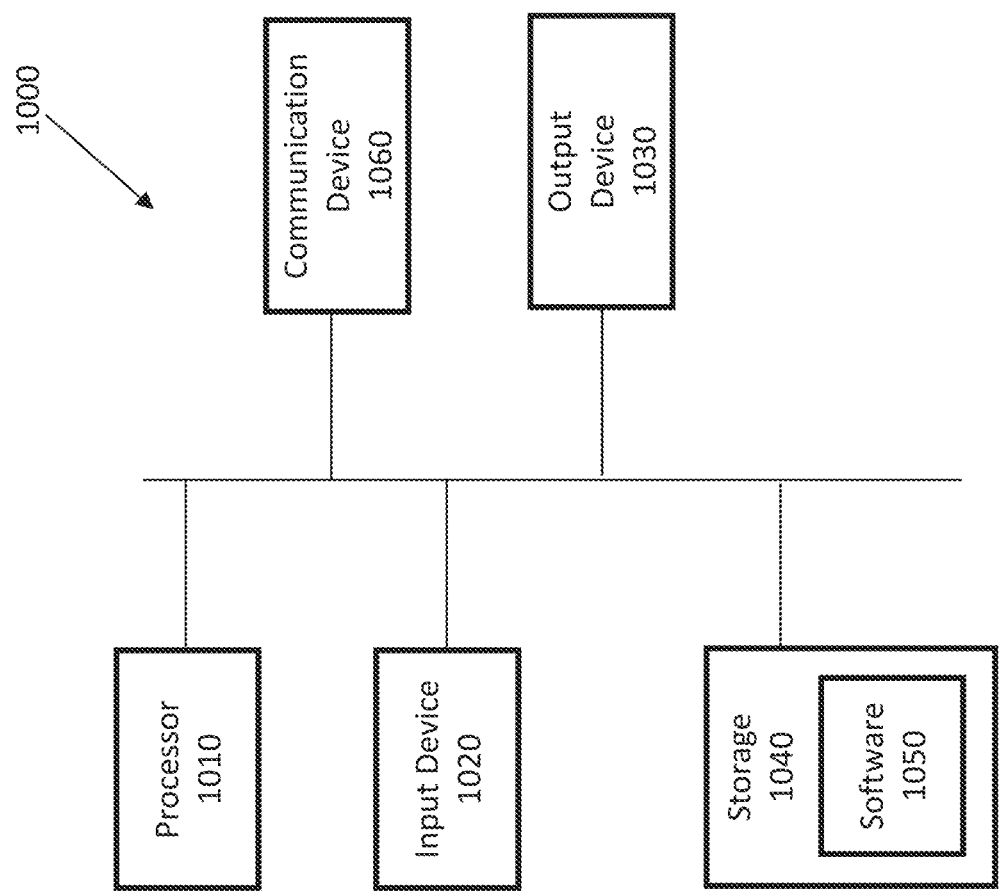
FIG. 10 illustrates an exemplary computing system.

FIG. 10 illustrates an example of a computing system 1000, which can be used, for example, for network operations center 112 of FIG. 1, such as for performing one or more steps of method 200 of FIG. 2, and/or for user terminals, such as UTs 104 and 106. System 1000 can be a computer connected to a network. System 1000 can be a client or a server. System 1000 can be any suitable type of processor-based system, such as a personal computer, workstation, server, handheld computing device (portable electronic device) such as a phone or tablet, or dedicated device. System 1000 can include, for example, one or more of input device 1020, output device 1030, one or more processors 1010, storage 1040, and communication device 1060. Input device 1020 and output device 1030 can generally correspond to those described above and can either be connectable or integrated with the computer.

Input device 1020 can be any suitable device that provides input, such as a touch screen, keyboard or keypad, mouse, gesture recognition component of a virtual/augmented reality system, or voice-recognition device. Output device 1030 can be or include any suitable device that provides output, such as a display, touch screen, haptics device, virtual/augmented reality display, or speaker.

Storage 1040 can be any suitable device that provides storage, such as an electrical, magnetic, or optical memory including a RAM, cache, hard drive, removable storage disk, or other non-transitory computer readable medium. Communication device 1060 can include any suitable device capable of transmitting and receiving signals over a network, such as a network interface chip or device. The components of the computing system 1000 can be connected in any suitable manner, such as via a physical bus or wirelessly.

Processor(s) 1010 can be any suitable processor or combination of processors, including any of, or any combination of, a central processing unit (CPU), field programmable gate array (FPGA), and application-specific integrated circuit (ASIC). Software 1050, which can be stored in storage 1040 and executed by one or more processors 1010, can include, for example, the programming that embodies the functionality or portions of the functionality of the present disclosure (e.g., as embodied in the devices as described above), such as programming for performing one or more steps of method 200 of FIG. 2.

Software 1050 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 1040, that can contain or store programming for use by or in connection with an instruction execution system, apparatus, or device.

Software 1050 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport computer readable medium can include, but is not limited to, an electronic, magnetic, optical, electromagnetic, or infrared wired or wireless propagation medium.

System 1000 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

System 1000 can implement any operating system suitable for operating on the network. Software 1050 can be written in any suitable programming language, such as C, C++, Java, or Python. In various examples, application software embodying the functionality of the present disclosure can be deployed in different configurations, such as in a client/server arrangement or through a Web browser as a Web-based application or Web service, for example.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A method for satellite communications network resiliency comprising, at a satellite service provider computing system:
    identifying a set of lost links between user terminals of a satellite communications network, wherein the lost links are due to a loss of at least one beam of the satellite communications network;
    determining a repointing of at least one user terminal to restore at least a portion of the lost links by using one or more optimization algorithms to determine a set of one or more user terminal repointings that maximize a reward based on the set of lost links and a network graph and a beam graph associated with the satellite communications network; and
    instructing repointing of the at least one user terminal.

2. The method of claim 1, wherein instructing repointing of the user terminal comprises instructing the user terminal to change at least one of a frequency, a polarization, and an orbital slot.

3. The method of claim 1, wherein the loss of the at least one beam is due to an adversarial attack.

4. The method of claim 1, wherein the reward is a revenue based on at least one revenue unit per unit data rate and at least one data rate of data traversing the network.

5. The method of claim 1, further comprising receiving data associated with a reward resulting from the repointing of the at least one user terminal and updating the one or more optimization algorithms based on the received data.

6. The method of claim 1, wherein identifying the set of lost links comprises determining at least one user terminal associated with the at least one lost beam and determining which user terminals are communicating with the at least one user terminal associated with the at least one lost beam.

7. The method of claim 1, wherein repointing of the at least one user terminal comprises repointing the at least one user terminal to a beam of a different satellite service provider and the reward is based on a cost to use the beam of the different satellite service provider.

8. The method of claim 1, wherein the at least one lost beam comprises a downlink beam or an uplink beam for the at least one user terminal.

9. A system comprising one or more processors, memory, and one or more programs stored in the memory for execution by the one or more processors for causing the system to perform a method comprising:
  identifying a set of lost links between user terminals of a satellite communications network, wherein the lost links are due to a loss of at least one beam of the satellite communications network;
  determining a repointing of at least one user terminal to restore at least a portion of the lost links by using one or more optimization algorithms to determine a set of one or more user terminal repointings that maximize a reward based on the set of lost links and a network graph and a beam graph associated with the satellite communications network; and
  instructing repointing of the at least one user terminal.

10. The system of claim 9, wherein instructing repointing of the user terminal comprises instructing the user terminal to change at least one of a frequency, a polarization, and an orbital slot.

11. The system of claim 9, wherein the loss of the at least one beam is due to an adversarial attack.

12. The system of claim 9, wherein the reward is a revenue based on at least one revenue unit per unit data rate and at least one data rate of data traversing the network.

13. The system of claim 9, further comprising receiving data associated with a reward resulting from the repointing of the at least one user terminal and updating the one or more optimization algorithms based on the received data.

14. The system of claim 9, wherein identifying the set of lost links comprises determining at least one user terminal associated with the at least one lost beam and determining which user terminals are communicating with the at least one user terminal associated with the at least one lost beam.

15. The system of claim 9, wherein repointing of the at least one user terminal comprises repointing the at least one user terminal to a beam of a different satellite service provider and the reward is based on a cost to use the beam of the different satellite service provider.

16. The system of claim 9, wherein the at least one lost beam comprises a downlink beam or an uplink beam for the at least one user terminal.

17. A non-transitory computer readable storage medium storing one or more programs for execution by one or more processors of a computing system for causing the system to perform a method that comprises:
  identifying a set of lost links between user terminals of a satellite communications network, wherein the lost links are due to a loss of at least one beam of the satellite communications network;
  determining a repointing of at least one user terminal to restore at least a portion of the lost links by using one or more optimization algorithms to determine a set of one or more user terminal repointings that maximize a reward based on the set of lost links and a network graph and a beam graph associated with the satellite communications network; and
  instructing repointing of the at least one user terminal.

* * * * *